United States Patent
Itoh et al.

(10) Patent No.: US 7,136,093 B1
(45) Date of Patent: Nov. 14, 2006

(54) INFORMATION PRESENTING APPARATUS, OPERATION PROCESSING METHOD THEREFOR, STORAGE MEDIUM STORING PROGRAM FOR EXECUTING OPERATION PROCESSING

(75) Inventors: Fumiaki Itoh, Yokohama (JP); Yuji Ikeda, Kawasaki (JP); Takaya Ueda, Yokohama (JP); Kenichi Fujii, Yokohama (JP); Noriko Otani, Ageo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/527,984

(22) Filed: Mar. 17, 2000

(30) Foreign Application Priority Data

Mar. 23, 1999 (JP) ................................. 11-078462
Mar. 15, 2000 (JP) ............................. 2000-072230

(51) Int. Cl.
*H04N 5/225* (2006.01)
*H04N 5/222* (2006.01)

(52) U.S. Cl. ............................. 348/207.11; 348/333.01; 348/211.4; 348/143

(58) Field of Classification Search ................ 348/143, 348/159, 149, 150, 153, 157, 207.99, 207.11, 348/705, 211.99, 211.4, 211.11, 211.13, 211.3, 348/211.8, 333.01, 333.02; 702/188
See application file for complete search history.

(56) References Cited

U.S. PATENT DOCUMENTS

| | | | |
|---|---|---|---|
| 5,412,400 A * | 5/1995 | Takahara et al. ............. 715/788 |
| 5,742,521 A | 4/1998 | Ellenby et al. | |
| 5,802,492 A * | 9/1998 | DeLorme et al. ......... 455/456.5 |
| 5,815,411 A | 9/1998 | Ellenby et al. | |
| 5,838,250 A | 11/1998 | Maekawa | |
| 6,023,241 A * | 2/2000 | Clapper .................. 342/357.13 |
| 6,037,936 A | 3/2000 | Ellenby et al. | |
| 6,133,947 A * | 10/2000 | Mikuni ....................... 348/143 |
| 6,182,116 B1 * | 1/2001 | Namma et al. ............. 709/204 |
| 6,198,479 B1 | 3/2001 | Humpleman et al. | |
| 6,208,376 B1 * | 3/2001 | Tanaka et al. .............. 348/153 |
| 6,266,082 B1 * | 7/2001 | Yonezawa et al. .......... 348/159 |
| 6,271,840 B1 * | 8/2001 | Finseth et al. .............. 715/513 |
| 6,278,461 B1 | 8/2001 | Ellenby et al. | |
| 6,282,362 B1 * | 8/2001 | Murphy et al. ............... 386/46 |
| 6,307,556 B1 | 10/2001 | Ellenby et al. | |
| 6,335,722 B1 | 1/2002 | Tani et al. | |
| 6,463,343 B1 | 10/2002 | Emens et al. | |
| 6,580,950 B1 | 6/2003 | Johnson et al. | |
| 6,608,649 B1 * | 8/2003 | Suzuki et al. ............ 348/211.8 |
| 6,625,812 B1 * | 9/2003 | Abrams et al. ............. 348/154 |
| 6,654,060 B1 * | 11/2003 | Kurosawa et al. ..... 348/333.02 |

(Continued)

FOREIGN PATENT DOCUMENTS

JP 5-204534 A 8/1993

(Continued)

OTHER PUBLICATIONS

U.S. Appl. No. 09/527,760, (filed Mar. 17, 2000).

(Continued)

*Primary Examiner*—Aung Moe
(74) *Attorney, Agent, or Firm*—Morgan & Finnegan, L.L.P.

(57) ABSTRACT

The present invention has as its object to automatically provide information about an object image-sensed by a camera and automatically image-sense and present an object described by browsed information while a user is browsing the information. To achieve this object, the present invention includes scope holding unit, picture operating unit, first instruction unit, picture display unit, map operating unit, second instruction unit, map display unit, document operating unit, third instruction unit, and document display unit.

62 Claims, 27 Drawing Sheets

U.S. PATENT DOCUMENTS

| | | |
|---|---|---|
| 6,661,966 B1 | 12/2003 | Furuyama et al. |
| 6,690,979 B1 | 2/2004 | Smith |
| 6,734,879 B1 | 5/2004 | Hasha et al. |
| 2001/0009429 A1 | 7/2001 | Soto et al. |
| 2003/0007104 A1 | 1/2003 | Hoshino et la. |
| 2003/0018753 A1 | 1/2003 | Seki |
| 2003/0200308 A1 | 10/2003 | Tameda et al. |

FOREIGN PATENT DOCUMENTS

| | | | |
|---|---|---|---|
| JP | 06054220 A | 2/1994 |
| JP | 6-284330 A | 10/1994 |
| JP | 9-037203 A | 2/1997 |

OTHER PUBLICATIONS

Japanese Office Action of corresponding Japanese Patent Application 2000-072230 (dated Mar. 28, 2006).

English machine translation of JP 9-037203 A.

English machine translation of JP 6-284330 A.

English machine translation of JP 5-204534 A.

\* cited by examiner

FIG. 16

| | 501 | 502 | |
|---|---|---|---|
| 1 | (20, 100), (20, 50), (50, 50), (50, 100) |
| 2 | (50, 100), (50, 10), (120, 10), (120, 100) |
| ⋮ | |
| 11 | (220, 180), (220, 130), (270, 130), (270, 180) |

FIG. 27
303
LIST OF RESTAURANTS
 ××RESTAURANT
 △△ANNEX
 □□RESTAURANT
 ○○RESTAURANT
⋮

INFORMATION PRESENTING APPARATUS, OPERATION PROCESSING METHOD THEREFOR, STORAGE MEDIUM STORING PROGRAM FOR EXECUTING OPERATION PROCESSING

FIELD OF THE INVENTION

The present invention relates to an information presenting apparatus for combining pieces of information such as an on-the-spot picture taken by a camera, map, and text document, and presenting the resultant information to a user, an information presenting method, and a computer-readable storage medium used for the apparatus and method.

BACKGROUND OF THE INVENTION

Conventionally, information presenting apparatuses are available, which acquire and display information such as pictures at camera angles designated by users operating cameras in remote places through networks such as the Internet upon operating devices at the user side. Some apparatus is designed to display a map of an area around the installation position of a camera on the apparatus, graphically show the camera angle, and operate the camera angle on the map, as well as operating the camera angle by directly designating the panning value, tilt value, and zoom value of the camera.

With an apparatus of this type, a user can virtually experience a remote place. In many cases, the user wants to see a specific object and know information about an object image-sensed by a camera.

Information about an object is provided by the WWW on the Internet and the like, and a user can browse the information with an apparatus having a WWW browser. However, the above conventional information presenting apparatus is not linked to such an information browsing apparatus. For this reason, it takes much time and labor for the user to see information to be browsed and operate the camera at the same time to see an object described with the browsed information or search the WWW or the like for information about an image-sensed object.

SUMMARY OF THE INVENTION

The present invention has been made in consideration of the above problems, and has as its object to automatically provide information about an object image-sensed by a camera and automatically image-sense and present an object described by browsed information while a user is browsing the information.

In order to achieve at least one of the objects described above, according to an embodiment of the present invention, there is provided an information presenting system comprising: scope holding means for holding a scope indicating an object to which a user is currently giving attention in accordance with at least one of a picture sensed by a camera, a map indicating a position of the camera, and a text document; picture operating means for changing an image-sensing range of the camera; first instruction means for instructing the camera to switch display pictures when the image-sensing range of the camera is changed by the camera operating means or the scope held in the scope holding means is changed, and instructing the scope holding means to hold a new scope corresponding to a new image-sensing range when the image-sensing range of the camera is changed by the picture display means; picture display means for displaying a picture within the image-sensing range of the camera which is designated by an instruction from the first instruction means; map operating means for changing the scope in the scope holding means by designating an object on the map by giving an instruction; second instruction means for updating display of a symbol indicating the image-sensing range of the camera which is displayed on the map when the scope is changed by the map operating means or the scope held in the scope holding means is changed, and instructing the scope holding means to hold a new scope when the scope is changed by the map operating means; map display means for displaying a map designated by an instruction from the second instruction means; document operating means for changing a display document by operating a text document; third instruction means for giving an instruction to switch documents when the display document is changed by the document operating means or the scope held in the scope holding means is changed, and instructing the scope holding means to hold a new scope when the display document is changed by the document operating means; and document display means for displaying the document designated by an instruction from the third instruction means.

According to another aspect of the present invention, there is provided an information presenting method comprising: the scope holding step of holding a scope indicating an object to which a user is currently giving attention in accordance with at least one of a picture sensed by a camera, a map indicating a position of the camera, and a text document; the picture operating step of changing an image-sensing range of the camera; the first instruction step of instructing the camera to switch display pictures when the image-sensing range of the camera is changed in the camera operating step or the scope held in the scope holding step is changed, and giving an instruction to hold a new scope corresponding to a new image-sensing range in the scope holding step when the image-sensing range of the camera is changed in the picture display step; the picture display step of displaying a picture within the image-sensing range of the camera which is designated by an instruction in the first instruction step; the map operating step of changing the scope in the scope holding step by designating an object on the map by giving an instruction; the second instruction step of updating display of a symbol indicating the image-sensing range of the camera which is displayed on the map when the scope is changed in the map operating step or the scope held in the scope holding step is changed, and giving an instruction to hold a new scope in the scope holding step when the scope is changed in the map operating step; the map display step of displaying a map designated by an instruction from in the second instruction step; the document operating step of changing a display document by operating a text document; the third instruction step of giving an instruction to switch documents when the display document is changed in the document operating step or the scope held in the scope holding step is changed, and giving an instruction to hold a new scope in the scope holding step when the display document is changed in the document operating step; and the document display step of displaying the document designated by an instruction in the third instruction step.

According to still another aspect of the present invention, there is provided a computer-readable medium storing a program comprising program codes of: the scope holding step of holding a scope indicating an object to which a user is currently giving attention in accordance with at least one of a picture sensed by a camera, a map indicating a position of the camera, and a text document; the picture operating step of changing an image-sensing range of the camera; the first instruction step of instructing the camera to switch display pictures when the image-sensing range of the camera is changed in the camera operating step or the scope held in the scope holding step is changed, and giving an instruction to hold a new scope corresponding to a new image-sensing range in the scope holding step when the image-sensing range of the camera is changed in the picture display step; the picture display step of displaying a picture within the image-sensing range of the camera which is designated by an instruction in the first instruction step; the map operating step of changing the scope in the scope holding step by instructing an object on the map by giving an instruction; the second instruction step of updating display of a symbol indicating the image-sensing range of the camera which is displayed on the map when the scope is changed in the map operating step or the scope held in the scope holding step is changed, and giving an instruction to hold a new scope in the scope holding step when the scope is changed in the map operating step; the map display step of displaying a map designated by an instruction in the second instruction step; the document operating step of changing a display document by operating a text document; the third instruction step of giving an instruction to switch documents when the display document is changed in the document operating step or the scope held in the scope holding step is changed, and giving an instruction to hold a new scope in the scope holding step when the display document is changed in the document operating step; and the document display step of displaying the document designated by an instruction in the third instruction step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 16 is a view showing the arrangement of an area data holding unit according to the fifth embodiment;

FIG. 27 is a view showing still another display example on the display according to the first embodiment.

DETAILED DESCRIPTION OF THE PREFERRED EMBODIMENTS

The embodiments of the present invention will be described below with reference to the accompanying drawings.

First Embodiment

Figure 1:
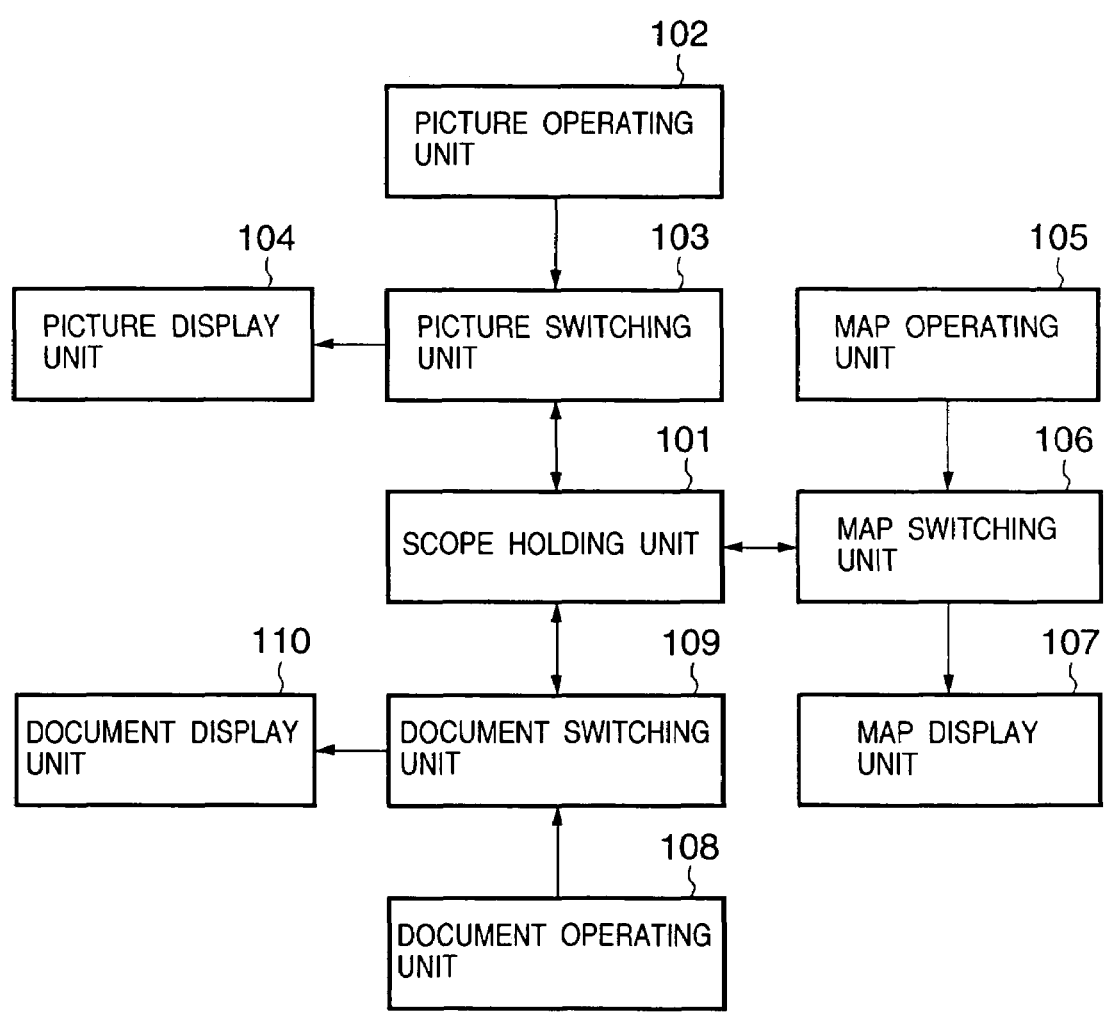
FIG. 1 is a block diagram showing the basic arrangement of an information presenting apparatus according to the first embodiment.

FIG. 1 is a block diagram showing the basic arrangement of an information presenting apparatus according to the first embodiment of the present invention.

Referring to FIG. 1, a scope holding unit 101 holds an object (to be referred to as a scope hereinafter) to which a user currently gives attention. Upon receiving a notification indicating a change of scope from a map switching unit 106 or document switching unit 109, the scope holding unit 101 transfers the information indicating the change of scope to the picture switching unit 103, map switching unit 106, and document switching unit 109.

A picture operating unit 102 changes an image-sensing range by changing the direction or zoom value of a camera (not shown) installed in a remote place. A target located in the new image-sensing range becomes a new scope. The picture switching unit 103 gives an instruction to switch pictures when the image-sensing range is changed by the picture operating unit 102 or a notification indicating a change of scope is received from the scope holding unit 101. When the image-sensing range is changed by the picture operating unit 102, the picture switching unit 103 transfers information indicating the change of scope to the scope holding unit 101.

A picture display unit 104 acquires a picture in the image-sensing range designated by an instruction from the picture switching unit 103 from an external camera, and displays it.

A map operating unit 105 changes a scope by operation on a map. The scope selected by this operation becomes a new scope. The map switching unit 106 gives an instruction to switch maps when several scopes are selected by the map operating unit 105 or a notification indicating a change of scope is received from the scope holding unit 101. When a scope is changed by the map operating unit 105, the map switching unit 106 transfers information indicating the change of scope to the scope holding unit 101. A map display unit 107 displays the map designated by an instruction from the map switching unit 106.

A document operating unit 108 changes a displayed document by operating a hypertext document. A scope changes in accordance with the displayed document designated by the document operating unit 108. The document switching unit 109 gives an instruction to switch documents when a displayed document is changed by the document operating unit 108 or a notification indicating a change of scope is received from the scope holding unit 101. When the scope is changed by the document operating unit 108, the document switching unit 109 transfers information indicating the change of scope to the scope holding unit 101. The document display unit 110 displays the document designated by an instruction from the document switching unit 109.

Figure 2:
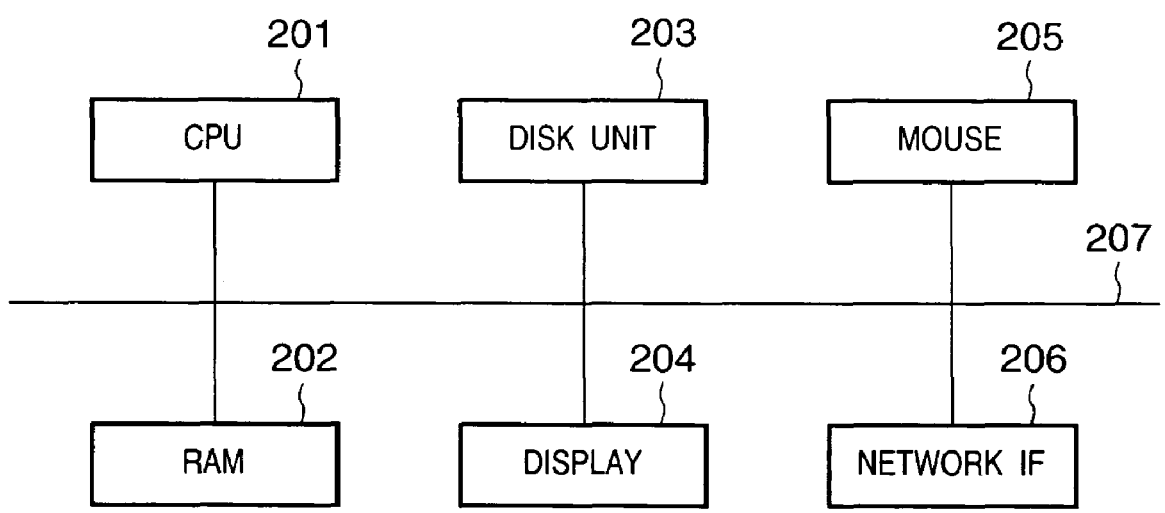
FIG. 2 is a block diagram showing a practical arrangement of the information presenting apparatus according to the first embodiment.

FIG. 2 is a block diagram showing a practical arrangement of the information presenting apparatus according to this embodiment.

Referring to FIG. 2, a CPU 201 controls the overall information presenting apparatus and operates in accordance with a program implementing the following procedure. A RAM 202 provides the scope holding unit 101 and a storage area required for processing operation of the above program. A disk unit 203 holds a program for implementing the procedure to be described later. A display 204 displays the picture display unit 104, map display unit 107, and document display unit 110. A mouse 205 is used to input operation performed by the user, and serves as part of the picture operating unit 102, map operating unit 105, and document operating unit 108. A network interface 206 acquires a picture in a designated image-sensing range from the external camera through the network. A bus 207 is used to exchange data within the information presenting apparatus.

Figure 3:
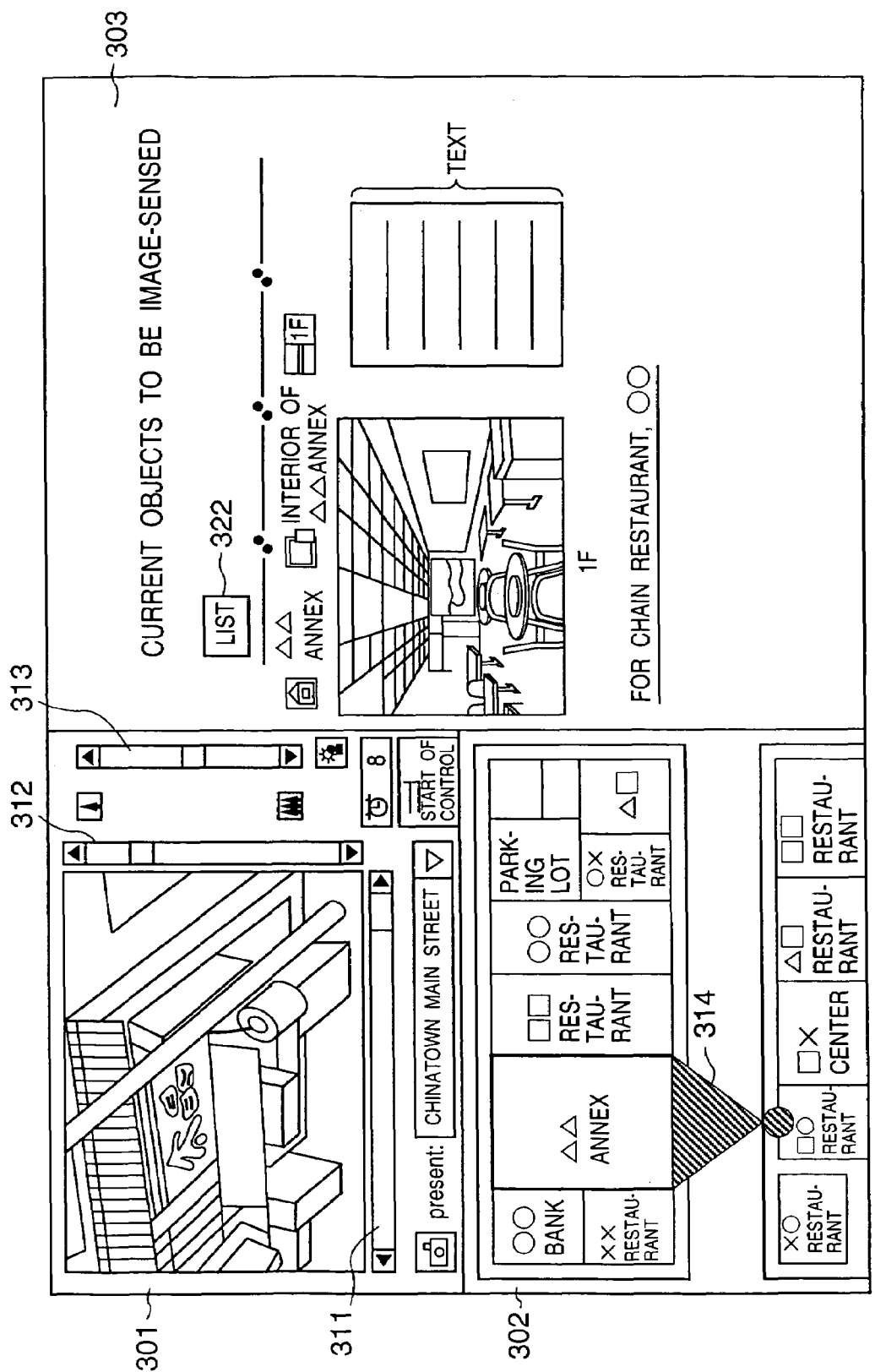
FIG. 3 is a view showing a display example according to the first embodiment.

FIG. 3 shows various pieces of information displayed on the display 204 of the information presenting apparatus.

Referring to FIG. 3, the picture display unit 104 outputs a picture 301. The picture 301 is displayed at an angle covering all objects corresponding to the scope held in the scope holding unit 101. The map display unit 107 outputs a map 302, on which the angle of the camera, which covers all the objects corresponding to the scope held in the scope holding unit 101, is graphically displayed as indicated by a symbol 314 in FIG. 3. A document display unit 110 outputs a document 303. The document 303 describes an object corresponding to the scope held in the scope holding unit 101.

When the user moves slide bars 311, 312, and 313 near the picture 301 with the mouse, the information presenting apparatus of this embodiment can inform the picture operating unit 102 of the operation for the picture. The user can pan the camera by horizontally moving the slide bar 311; can tilt the camera by vertically moving the slide bar 312; and can change the zoom magnification of the camera by vertically moving the slide bar 313.

As a result of camera operation, a store displayed at the camera angle after the operation is determined as a new scope.

The user can inform the map operating unit 105 of operation on the map 302 by clicking on a store area on the map 302. A store corresponding to the clicked area becomes a new scope.

The displayed document 303 is a hypertext document. When the user clicks on a link portion (anchor) displayed with an underline, the current document is switched to another document. The store described by the new document becomes a new scope.

The scope holding unit 101 holds a list of integral values (numbers) representing objects. In this embodiment, the scope holding unit 101 holds the following values: value 1 representing XX restaurant, value 2 representing ∆∆ annex, value 3 representing □□ restaurant, value 4 representing ○○ restaurant, value 5 representing ○X store, value 6 representing ∆□, value 7 representing X○ restaurant, value 8 representing □○ restaurant, value 9 representing □X center, value 10 representing ∆○ restaurant, and value 11 representing ∆∆ restaurant. The scope holding unit 101 also holds value 0 which is a special value corresponding to no restaurant. When the scope holding unit 101 takes value 0, the picture display unit 104 displays a default picture. In this case, the map display unit 107 displays a map without any camera angle, and a document display unit 110 displays a default document.

FIG. 3 shows a display example displayed by each display unit when the scope holding unit 101 holds value 2. A state wherein the camera angle of the camera installed at □○ restaurant is set to ∆∆ annex is displayed on the map 302. ∆∆ annex image-sensed by the camera is displayed on the picture 301. A hypertext document about ∆∆ annex is displayed on the document 303.

When the user clicks on an at-a-glance button 322, a list of restaurants is displayed as anchors, as shown in FIG. 27. When the user clicks on an anchor corresponding to a desired restaurant, the scope held in the scope holding unit 101 is changed to the clicked object.

Figure 4:
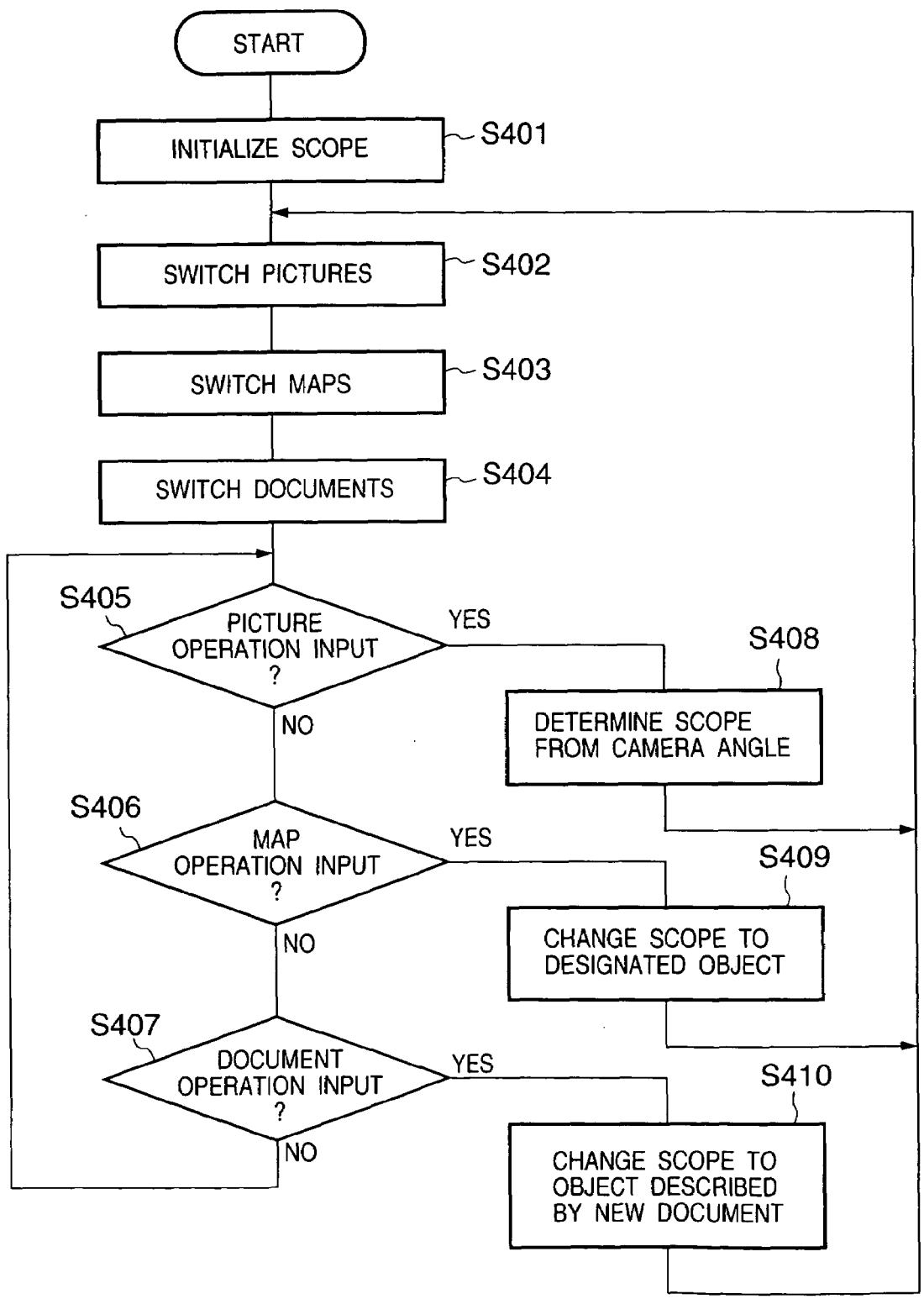
FIG. 4 is a flow chart showing information display processing according to the first embodiment.

A procedure for information display processing in this embodiment will be described below with reference to the flow chart of FIG. 4. Note that the processing shown in FIG. 4 is performed by the CPU 201.

First of all, the CPU 201 performs initialization in step S401. The CPU 201 sets a predetermined value, e.g., 0, in the scope holding unit 101. The flow then advances to step S402.

In step S402, the picture switching unit 103 acquires a picture at a camera angle covering all objects corresponding to the held scope from the remote camera on the basis of the scope value held in the scope holding unit 101, and switches the picture displayed by the picture display unit 104 to the acquired picture. The flow then advances to step S403.

In step S403, the map switching unit 106 changes the graphically displayed state of the angle of a camera icon on the map 302 so as to cover all objects corresponding to the held scope in accordance with the scope value held in the scope holding unit 101. The flow then advances to step S404.

In step S404, the document switching unit 109 switches the document displayed by the document display unit 110 to a document describing an object corresponding to the held scope in accordance with the scope value held in the scope holding unit 101. The flow then advances to step S405.

In step S405, the CPU 201 checks whether a camera operation input is received from the user at the picture operating unit 102. If YES in step S405, the flow advances to step S408. If NO in step S405, the flow advances to step S406. In step S406, the CPU 201 checks whether a map operation input is received from the user at the map operating unit 105. If YES in step S406, the flow advances to step S409. If NO in step S406, the flow advances to step S407. In step S407, the CPU 201 checks whether a document operation input is received from the user at the document operating unit 108. If YES in step S407, the flow advances to step S410. If NO in step S407, the flow returns to step S405.

In step S408, the CPU 201 determines a camera angle in accordance with a picture operation input from the user. More specifically, a panning value, tilt value, and zoom value are determined for the camera in accordance with the positions of the slide bars 311, 312, and 313 moved by the user. The CPU 201 further obtains an object image-sensed at this camera angle, and sets a corresponding value in the scope holding unit 101. If there are a plurality of objects image-sensed by the camera, a plurality of corresponding values are set in the scope holding unit 101. The flow then returns to step S402.

In step S409, the CPU 201 obtains a newly selected object depending on the position on the map at which the user performs mouse clicking that corresponds to the map operation input from the user. An object in the area including the clicked point is selected. The CPU 201 then sets a value corresponding to the selected object in the scope holding unit 101. If a plurality of objects are selected by the user, values corresponding to all the objects are set in the scope holding unit 101. The flow then returns to step S402.

In step S410, the CPU 201 obtains a document to be displayed next in accordance with the operation of tracing back a hyperlink, i.e., the document operation input from the user. The CPU 201 sets a value corresponding to the object described by the document in the scope holding unit 101. The flow then returns to step S402.

A method of obtaining an image-sensed object from a camera angle and a method of obtaining a camera angle covering all designated objects will be described next.

Consider first a plane taking the panning and tilt values of the camera on the X-axis and Y-axis, respectively. When each object that can be image-sensed by the camera is image-sensed by the camera, each shape projected on this plane is considered as a polygon, and values corresponding to the respective vertexes of the polygon projected on the plane are generated and held in the picture switching unit 103 in advance.

When the camera angle is changed, the CPU 201 obtains intersections between a polygon (a square having sides obtained by subtracting/adding ½ the zoom value from/to the panning and tilt values) representing the current camera angle on the plane and the projected polygon of each object described above, thereby obtaining an object having the intersections as an object that is newly image-sensed.

When the object (scope) to be image-sensed is changed, the CPU 201 calculates the sums of values representing the projected polygons of the respective objects, and obtains a square (having each side parallel to the X-axis or Y-axis) including all the sums. The center of gravity of this square is set as the panning and tilt values of the camera, and the length of each side is set as the zoom value of the camera.

In this embodiment, a table indicating the correspondence between the respective areas on the map and the objects and between the documents and the objects is generated in advance and stored in the disk unit 203.

Second Embodiment

In addition to the arrangement of the first embodiment, the second embodiment has an arrangement for presenting information as an advice from the information presenting apparatus side to a user.

Figure 5:
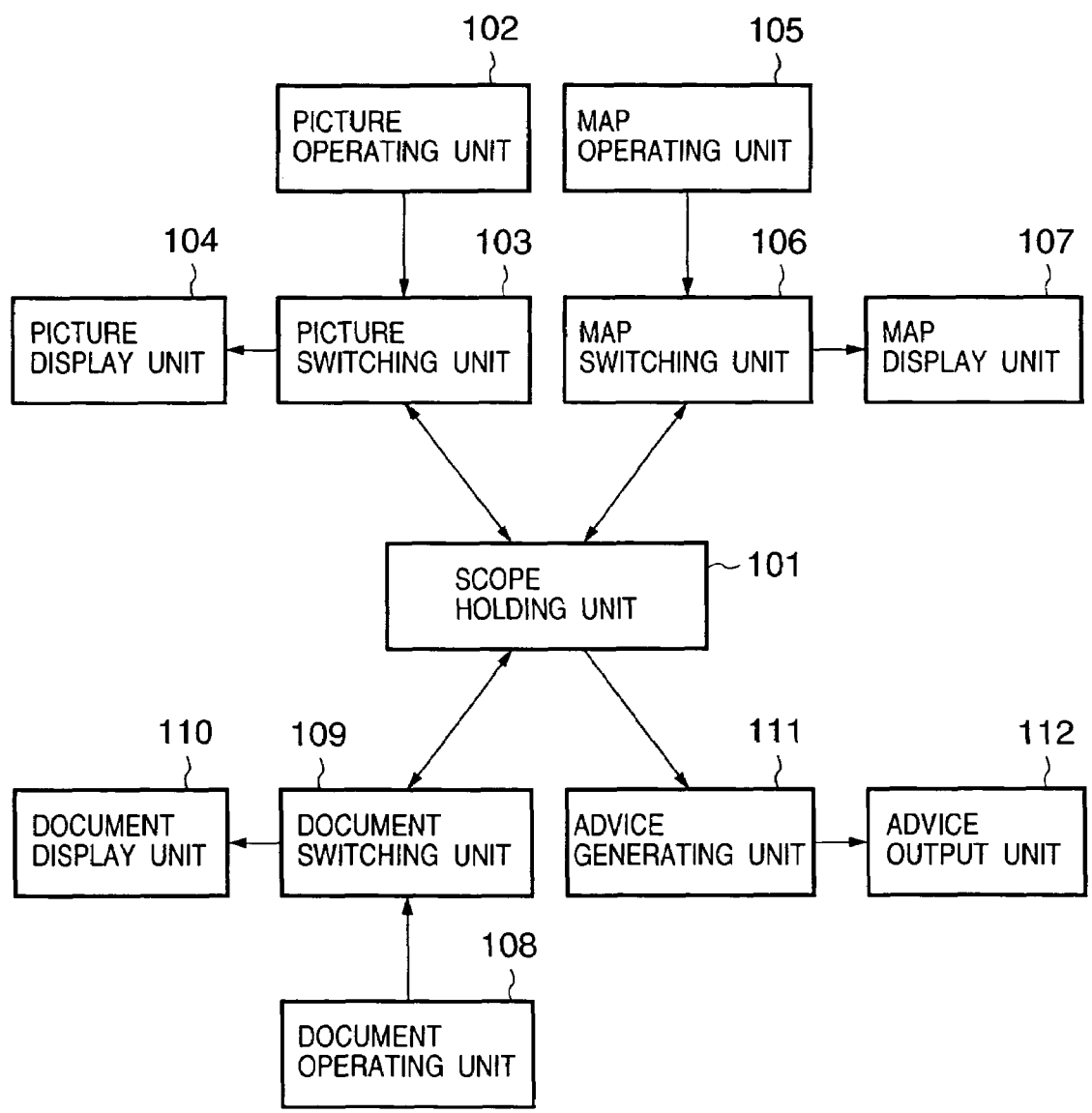
FIG. 5 is a block diagram showing the basic arrangement of an information presenting apparatus according to the second embodiment.

FIG. 5 is a block diagram showing the basic arrangement of the information presenting apparatus according to this embodiment.

Referring to FIG. 5, reference numeral 111 denotes an advice generating unit for generating an advice about an object included in a scope in accordance with the scope held in a scope holding unit 101; and 112, an advice output unit for outputting the advice generated by the advice generating unit 111.

Other blocks 101 to 109 have basically the same arrangements as those in the FIG. 1, and hence a description thereof will be omitted.

Figure 6:
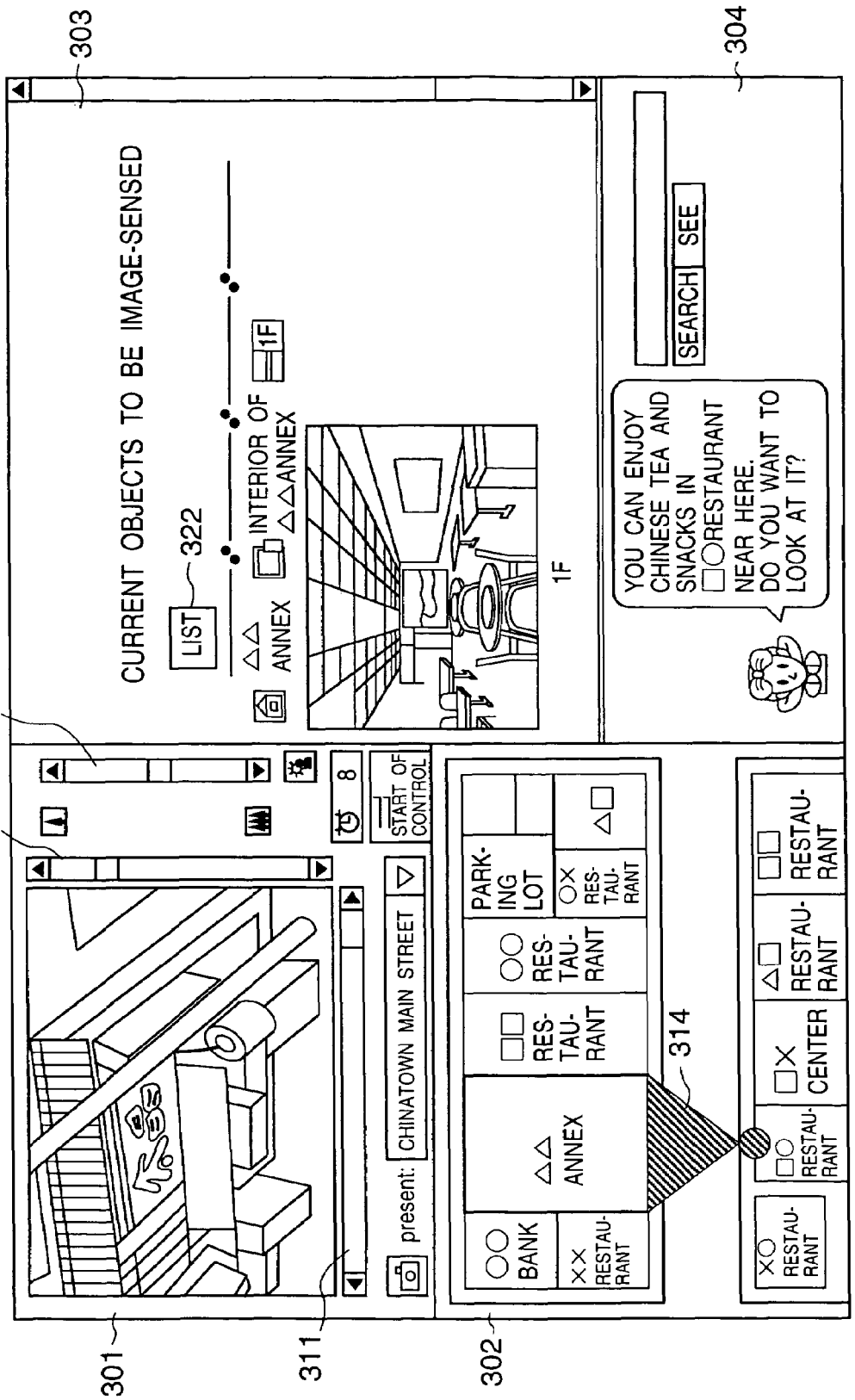
FIG. 6 is a view showing a display example according to the second embodiment.

FIG. 6 shows an example of information displayed on the display of the information presenting apparatus of this embodiment.

Referring to FIG. 6, reference numerals 301, 302, and 303 respectively denote a picture, map, and document similar to those shown in FIG. 3; and 304, an advice output from the advice output unit 112. As this advice 304, information that is associated with an object included in the scope and likely to raise a user's interest is output. Assume that the object is a restaurant. In this case, if a restaurant having a menu that seems to match with a user's taste is included in the scope, information indicating the presence of the menu and an explanation of the menu are displayed.

If an object that cannot be image-sensed is included in the scope in the first and second embodiments, a default picture stored in advance may be displayed instead of a picture of the object.

In the first and second embodiments, each scope corresponds to one object. However, the present invention is not limited to this. A scope may correspond to a plurality of objects.

Figure 24:
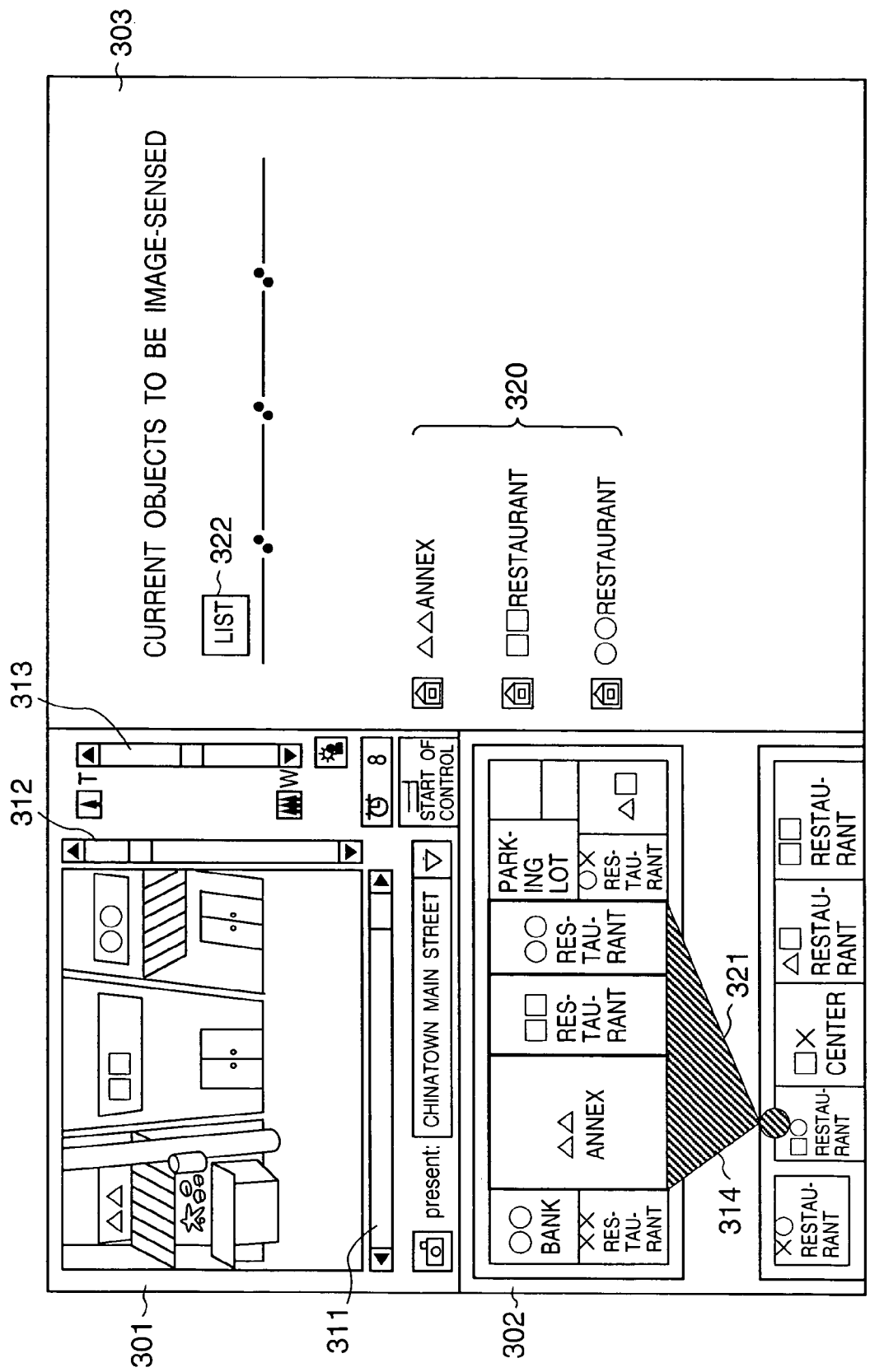
FIG. 24 is a view showing a display example on a display according to the first embodiment.

FIG. 24 shows a display example in the information presenting apparatus in such a case. If, for example, a plurality of objects (ΔΔ annex, □□ restaurant, and ○○ restaurant in FIG. 24) are selected on the map 302 in the display state shown in FIG. 3, the scope holding unit 101 holds all the selected objects as a scope. The picture switching unit 103 commands to control the camera to shift the zoom magnification to the wide-angle side so as to cover all the selected objects. At the same time, a document display unit 110 displays a list of documents about all the selected objects (referring to FIG. 24, in order to avoid complexity caused when pieces of information about the respective objects are displayed on the document 303 at once, only anchors 320 corresponding to the respective objects are displayed in this embodiment, and information corresponding to each object is presented through the network when the user clicks on a corresponding anchor), as shown in FIG. 24.

If, for example, the user operates a slide bar 313 in the display state in FIG. 3 to shift the zoom magnification of the camera to the wide-angle side, all objects (ΔΔ annex, □□ restaurant, and ○○ restaurant in FIG. 24) existing in the image-sensing range of the camera are held as a scope in the scope holding unit 101. The document operating unit 108 then commands the map display unit 107 to switch the display of a camera symbol 314 on the map 302 to that shown in FIG. 24 so as to indicate that all the objects held in the scope holding unit 101 are image-sensed. At the same time, the document display unit 110 displays a list of documents (the anchors 320 corresponding to the respective objects are displayed in FIG. 24, and information is presented when the user clicks on the anchors) about all the objects held in the scope holding unit 101, as shown in FIG. 24.

On the contrary, if the number of objects existing in the scope decreases, i.e., the state shown in FIG. 24 shifts to the state shown in FIG. 3, the picture switching unit 103 controls the zoom magnification (also controls panning and tilting of the camera, as needed) of the camera to shift it to the telephoto side to image-sense the object held in the scope holding unit 101 as a main object, and the map display unit 107 is commanded to switch the display of the camera symbol 314 on the map 302 to that shown in FIG. 3. The document display unit 110 may display only a document about the object held in the scope holding unit 101, as shown in FIG. 24.

The picture/map/document switching operation described above is performed in steps S402 to S404 in FIG. 4.

According to the above description, all objects as a scope can be image-sensed by one camera. If, however, all objects as a scope cannot be simultaneously image-sensed by one camera, a picture obtained by image-sensing only objects that can be simultaneously image-sensed may be displayed. A panoramic picture obtained by image-sensing objects at different camera angles and synthesizing the resultant pictures may be displayed, or a plurality of pictures obtained in advance by image-sensing objects may be displayed. Alternatively, the camera angle may be automatically switched at predetermined intervals to image-sense the respective objects, and the resultant pictures may be displayed.

If a desired object cannot be obtained by a camera as a control target even by displaying a panoramic picture or automatically operating the camera, a default picture stored in a disk unit 203 in advance may be displayed instead of the desired picture.

If a list of stores is displayed as shown in FIG. 27, the scope held in the scope holding unit 101 includes all the stores presented in the list. The picture displayed by the picture display unit 301 is a default picture.

Note that the advice generating unit 111 may generate information about each target as an advice.

In addition, according to the above description, a single map is displayed by the map display unit 107. However, the present invention is not limited to this. A plurality of maps on different reduced scales may be held in the disk unit 203 and switched in accordance with the object to be image-sensed. In this case, the current map is switched to a map including all objects as a scope. For example, FIG. 25 shows such a case.

Assume that the user has controlled the remote camera by operating slide bars 311 to 313. In this case, "A restaurant" as an object is included in the image-sensing range of the camera, and a scope corresponding to "A restaurant" is held in the scope holding unit 101. However, "A restaurant" is not displayed on the map 302. The map switching unit 106 therefore performs control to switch the current map to a map on a reduced scale large enough to display the "A restaurant" as shown in FIG. 24. Note that data of objects to be image-sensed which can be displayed are added as attached information to a plurality of maps held in the disk unit 203. The map switching unit 106 searches for a map on the basis of the attached information. In this case, of the maps that are searched out, a map on the minimum reduced scale may be displayed by the map display unit 107.

Figure 25:
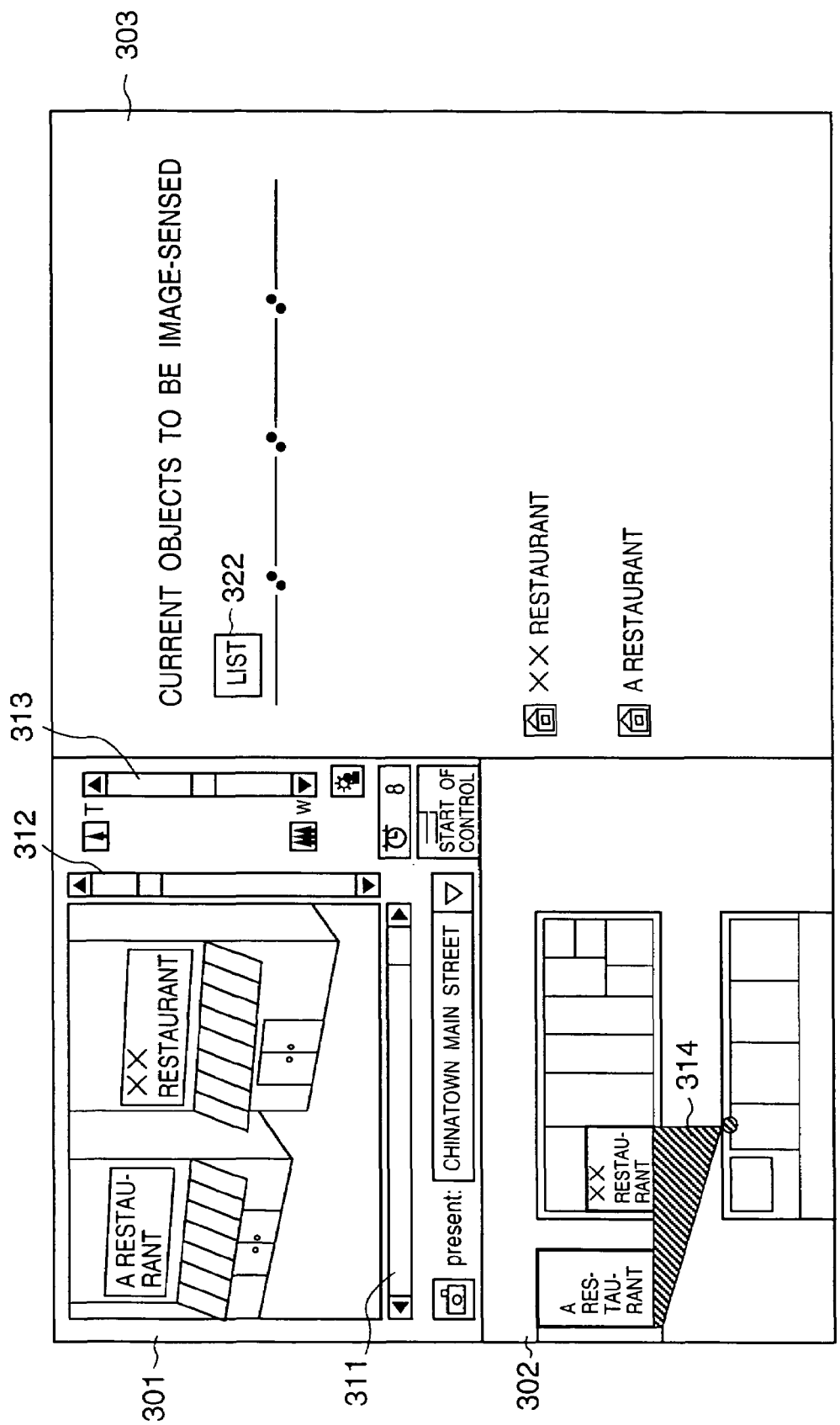
FIG. 25 is a view showing another display example on the display according to the first embodiment.
Figure 26:
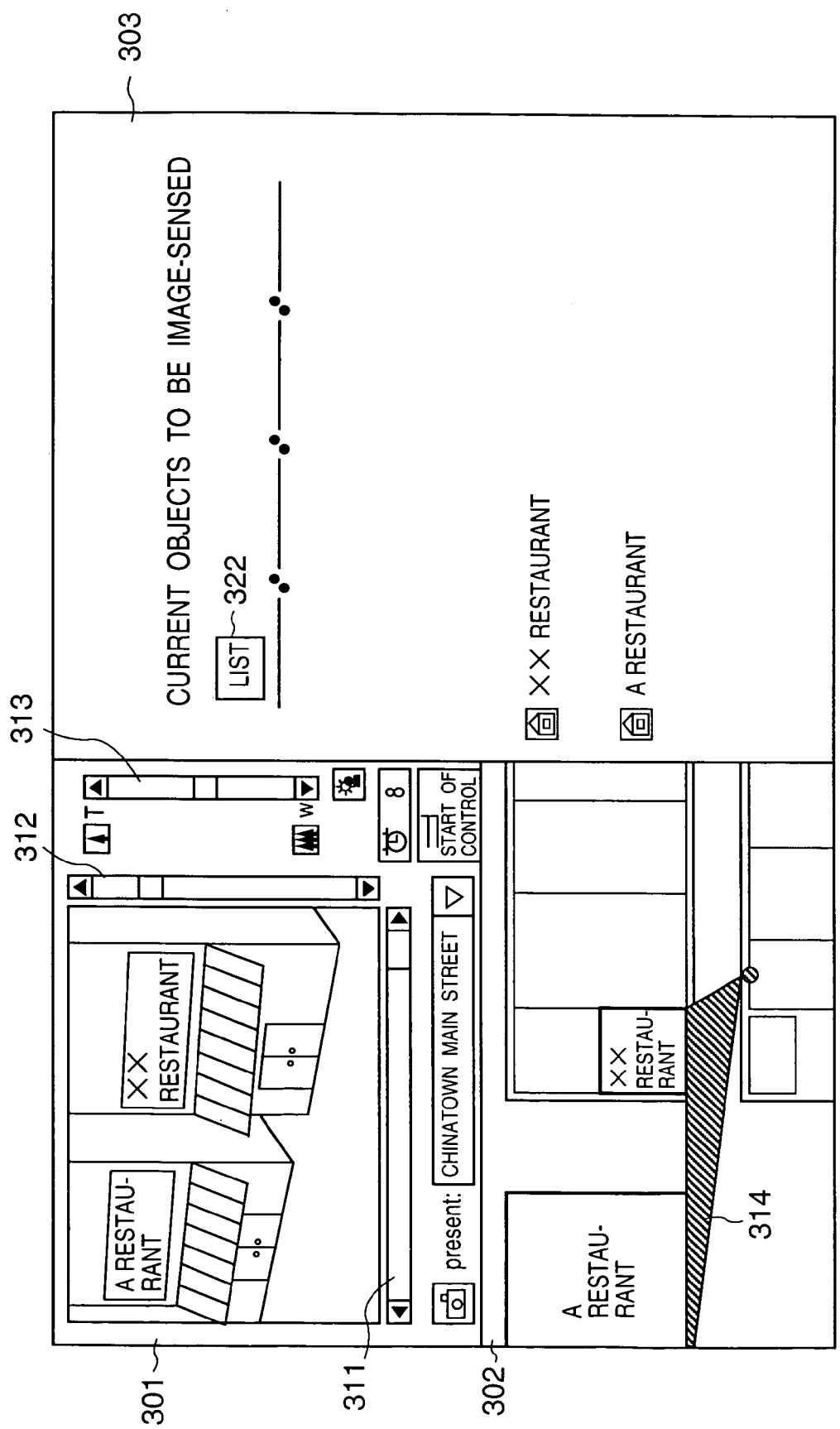
FIG. 26 is a view showing still another display example on the display according to the first embodiment.

Objects may be displayed by scrolling one map, as shown in FIG. 26, instead of changing the reduced scale of a map to be displayed as shown in FIG. 25. In this case, the map switching unit 106 holds information about each object displayed on the map 302, and checks on the basis of the information whether "A restaurant" is displayed. Upon determining that "A restaurant" is not displayed, the map switching unit 106 may command the map display unit 107 to scroll the map to display "A restaurant".

According to the third and fourth embodiments to be described below, the image-sensing condition of a camera is accurately detected to present information indicating whether a given object displayed on a map can be image-sensed by the camera or is actually image-sensed by the camera, in consideration of a case wherein an object designated by an instruction as a target to be image-sensed may differ from an object actually image-sensed by the camera because, for example, the object protrudes from the field defined by the field angle, resulting in confusion for the user.

Figure 7:
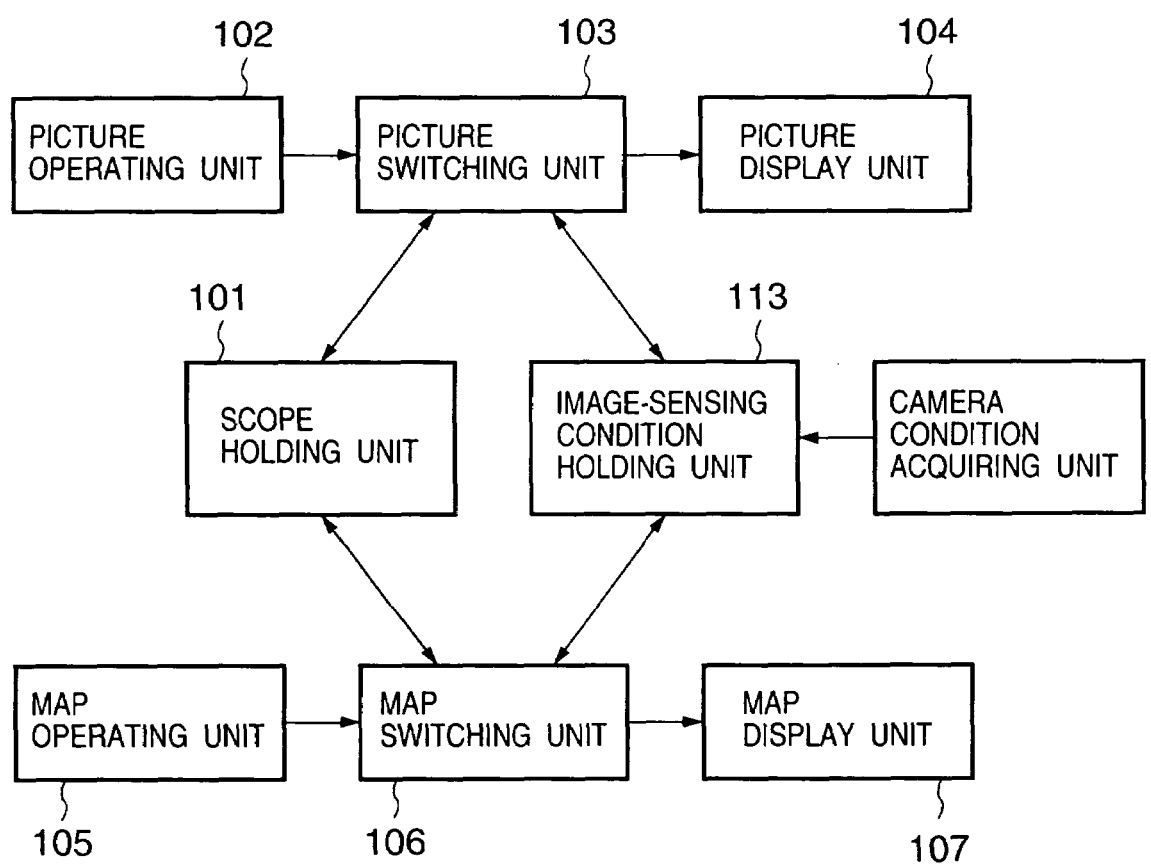
FIG. 7 is a block diagram showing the basic arrangement of an information presenting apparatus according to the third embodiment.

FIG. 7 is a block diagram showing the basic arrangement of an information presenting apparatus according to the third embodiment. The practical arrangement of the third embodiment is the same as that shown in FIG. 2.

Referring to FIG. 7, an image-sensing condition holding unit 113 holds the current image-sensing condition of a camera. The corresponding data is stored in a RAM 202 in FIG. 2. The arrangement of the remaining portion is the same as that shown in FIG. 1 except that a picture switching unit 103 switches pictures by controlling the camera when a picture operating unit 102 changes the image-sensing range, the scope held in the scope holding unit 101 changes, or the image-sensing condition held in the image-sensing condition holding unit 113 changes, and a map switching unit 106 changes map display when a map operating unit 105 changes a scope, the scope held in the scope holding unit 101 changes, or the image-sensing condition held in the image-sensing condition holding unit 113 changes. Although the arrangement of the remaining portion is the same as that shown in FIG. 1, the document operating unit, document switching unit, and document display unit are omitted from this embodiment.

Figure 8:
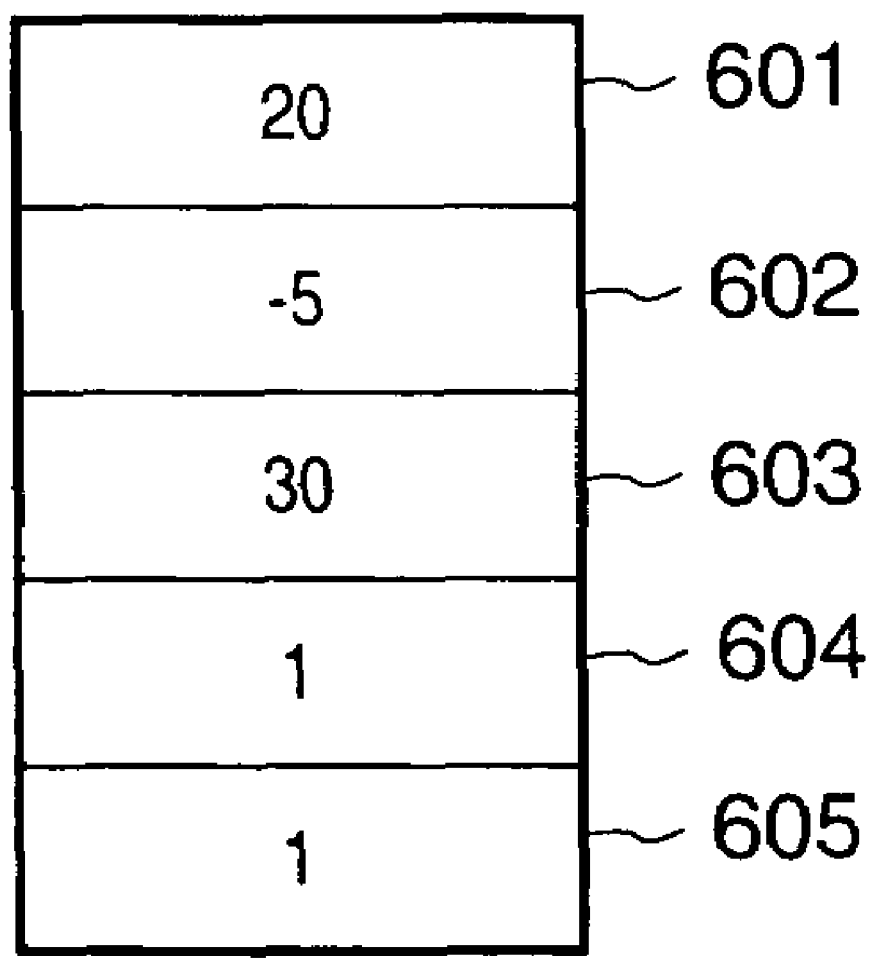
FIG. 8 is a view showing the arrangement of an image-sensing condition holding unit according to the third embodiment.

FIG. 8 shows an example of the data structure of the image-sensing condition holding unit 113.

Referring to FIG. 8, a panning value 601 is expressed in degrees with the initial position of the camera being 0, and a position in the right direction being a positive value. A tilt value 602 is expressed in degrees with the initial position of the camera being 0, and a position in the upward direction being a positive value. As a zoom value 603, the field angle of the camera in the horizontal direction is expressed in degrees. An integral value 604 indicates whether all objects as a scope can be simultaneously image-sensed by the camera. If this value is 1, it indicates that all the objects can be image-sensed. If the value is 0, it indicates that the value of the current camera angle differs from the value held in the image-sensing condition holding unit 113, or not all the objects can be image-sensed at once.

Figure 9:
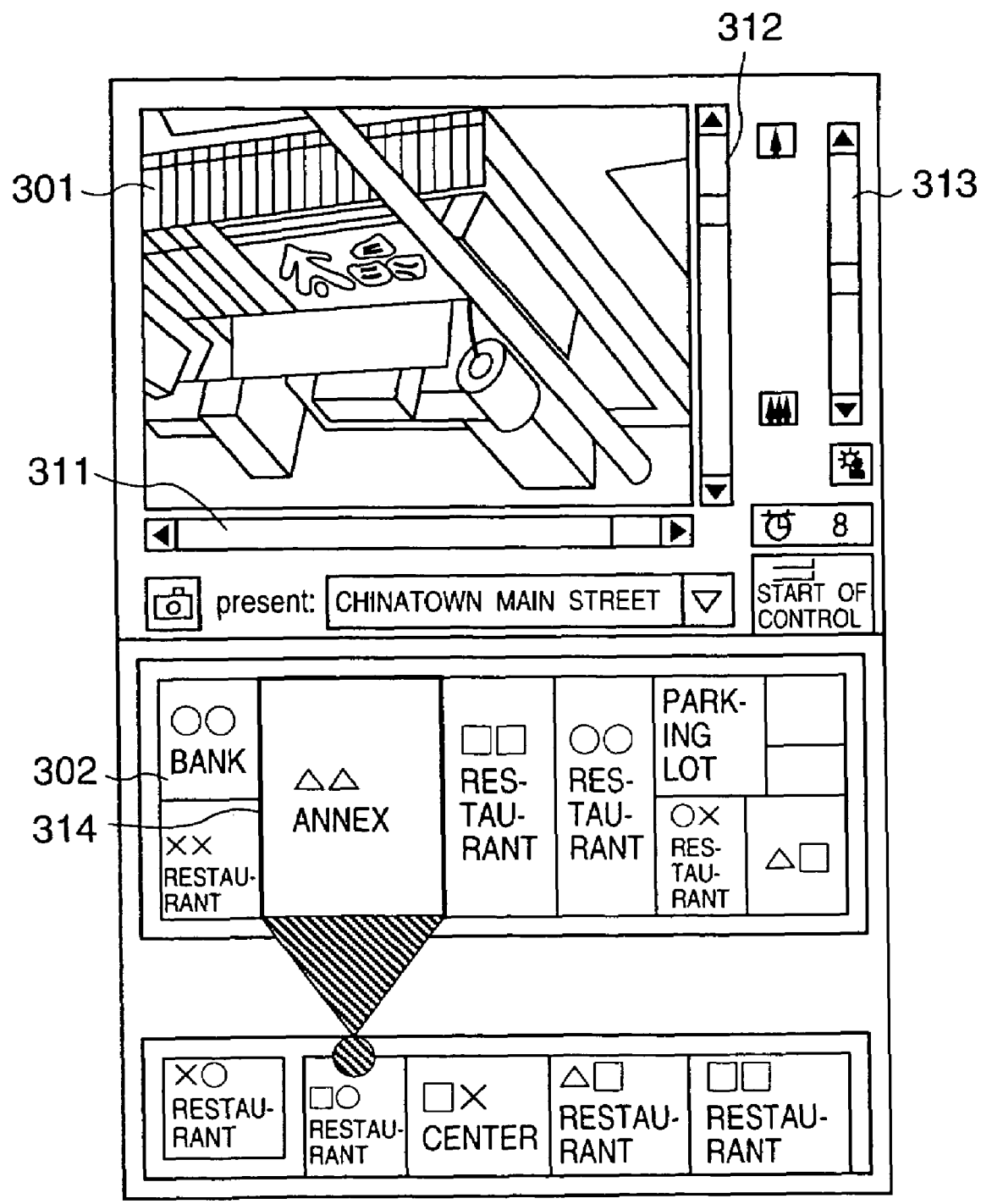
FIG. 9 is a view showing a display example according to the third embodiment.

FIG. 9 shows an example of how information is displayed and presented by the display 204.

Since components 301, 302, and 311 to 313 are the same as those in FIG. 3, a description thereof will be omitted. Reference numeral 314 denotes a highlighted portion indicating the area of an object as a scope on the map 302. In addition, a camera angle is displayed on the map 302 by referring to the camera angle of the image-sensing condition information held in the image-sensing condition holding unit 113. The image-sensing condition holding unit 113 also displays the camera angle in blue on the map 302 when the value 604 indicating whether all objects can be image-sensed is 1 (indicating that all objects can be image-sensed), and displays the camera angle in red on the map 302 if the value 604 is 0 (indicating that not all objects can be image-sensed).

A procedure for information display processing in this embodiment will be described with reference to the flow chart of FIG. 10.

First of all, initialization is performed in step S501. A predetermined value, e.g., 0, is set in the scope holding unit 101. The flow then advances to step S502. In step S502, the picture switching unit 103 determines a camera angle in accordance with the value of the scope held in the scope holding unit 101. More specifically, if there is a camera angle that covers all objects corresponding to the held scope, the picture switching unit 103 selects it. Otherwise, the picture switching unit 103 determines some appropriate angle. The picture switching unit 103 then acquire a picture at the determined camera angle from the remote camera, and switches the current picture on a picture display unit 104 to the acquired picture. In addition, the image-sensing condition of the camera is held in the image-sensing condition holding unit 113. The flow then advances to step S503.

In step S503, the map switching unit 106 instructs a map display unit 107 to display a map covering all objects corresponding to the held scope in accordance with the value of the scope held in the scope holding unit 101, highlight an area (314 in FIG. 9) corresponding to the scope on the map in the color described above in accordance with the image-sensing condition held in the image-sensing condition holding unit 113, and display the camera angle on the map. The flow then advances to step S504.

In step S504, it is checked whether a picture operation input is received from the user. If YES in step S504, the flow advances to step S506. If NO in step S504, the flow advances to step S505. In step S505, it is checked whether a map operation input is received from the user. If YES in step S505, the flow advances to step S507. If NO in step S505, the flow returns to step S504.

In step S506, a new camera angle is determined in accordance with the picture operation input from the user. A panning value, tilt value, and zoom value are determined for the camera in accordance with the position of the camera after the slide bars 311, 312, and 313 are moved. These values and a value indicating that the scope can be image-sensed are held in the image-sensing condition holding unit 113. An object to be image-sensed at this camera angle is obtained, and a corresponding value is held in the scope holding unit 101. The flow then returns to step S503.

In step S507, a newly selected object is obtained depending on the map operation input from the user, i.e., the position on the map at which the user has clicked. A value corresponding to the obtained object is held in the scope holding unit 101. The flow then returns to step S502.

Note that the method of obtaining an image-sensed object from the camera angle and the method of obtaining a camera angle covering all designed objects are the same as those in the first embodiment.

Fourth Embodiment

In the third embodiment, a still image sensed most recently is used as a picture displayed on the picture display unit 104. However, the present invention is not limited to this. Moving images may be used. In this case, moving images are acquired from the camera and displayed concurrently with the processing described with reference to FIG. 10. When moving images are to be used, moving images at a designated camera angle may not be acquired if, for example, a plurality of users simultaneously use the camera.

Such a problem may be solved by a method of displaying a default picture or a method of storing the latest picture frame at a designed angle and outputting the corresponding picture as a still image. In this case, the displayed picture does not correspond to the current moving images at the camera angle displayed by a map display unit 107. In this embodiment, therefore, if the current camera angle does not correspond to the picture displayed on a picture display unit 104 because another user is operating the camera as in the above case, the camera angle is displayed in a different color (e.g., yellow).

Figure 11:
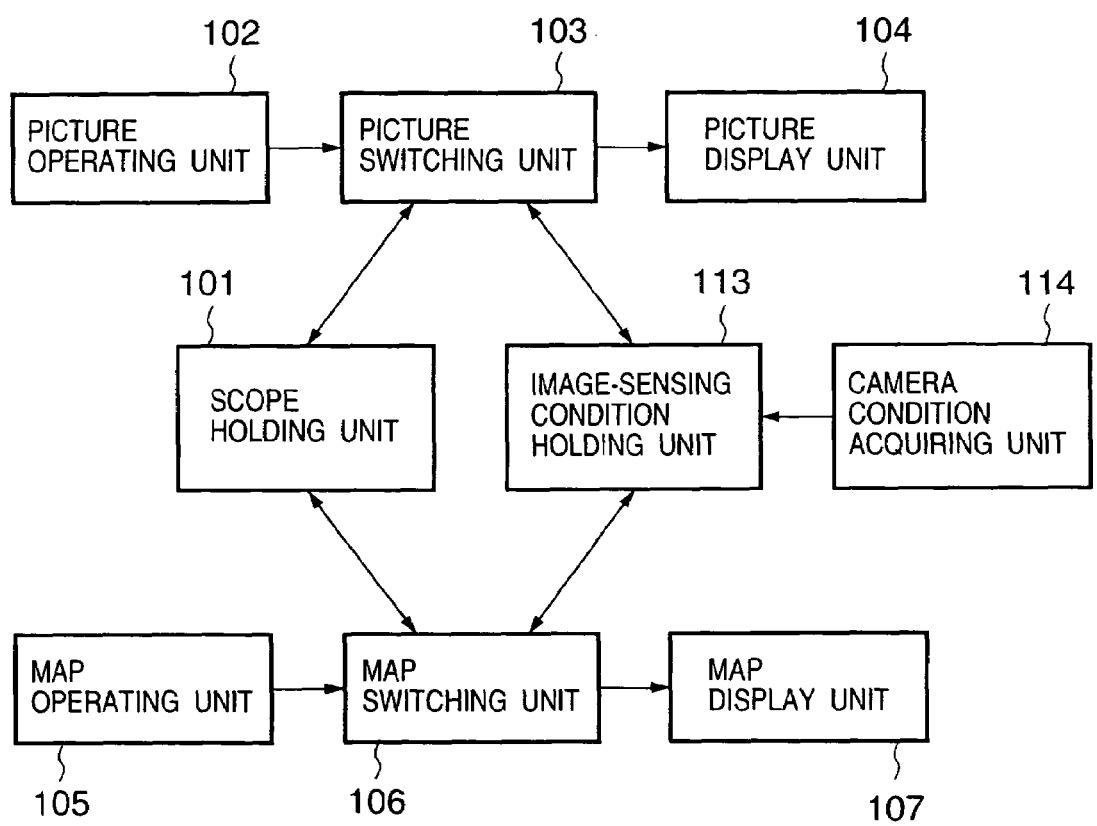
FIG. 11 is a block diagram showing the basic arrangement of an information presenting apparatus according to the fourth embodiment.

FIG. 11 is a block diagram showing an information presenting apparatus according to the fourth embodiment of the present invention.

Figure 12:
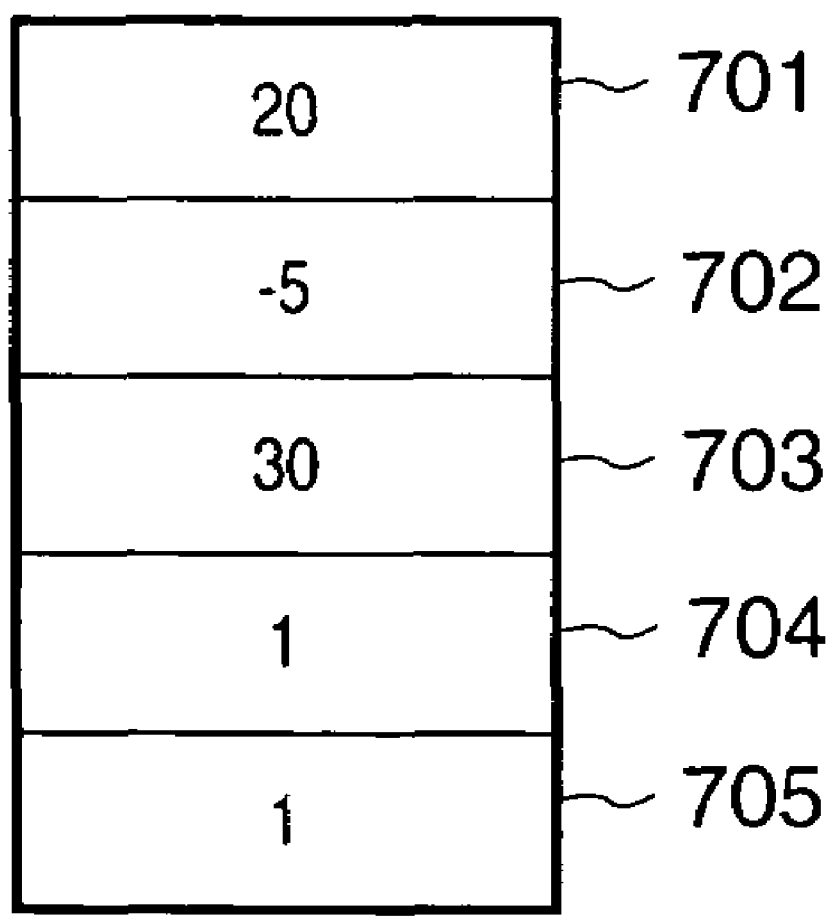
FIG. 12 is a view showing the arrangement of an image-sensing condition holding unit according to the fourth embodiment.

Referring to FIG. 11, reference numeral 114 denotes a camera condition acquiring unit 114 for acquiring, from a remote camera, information indicating whether moving images can be acquired at the camera angle designated by a picture switching unit 103 (i.e., whether the camera is currently used by another user), and holds the information in an image-sensing condition holding unit 113. Since the arrangement of the remaining portion is the same as that shown in FIG. 7, a description thereof will be omitted. FIG. 12 shows an example of the data structure of the image-sensing condition holding unit 113 in this embodiment.

Referring to FIG. 12, a panning value 701 is expressed in degrees with the initial position of the camera being 0, and a position in the right direction being a positive value. A tilt value 702 is expressed in degrees with the initial position of the camera being 0, and a position in the upward direction being a positive value. As a zoom value 703, the field angle of the camera in the horizontal direction is expressed in degrees. An integral value 704 indicates whether all objects as a scope can be simultaneously image-sensed by the camera. If this value is 1, it indicates that all the objects can be image-sensed. If the value is 0, it indicates that not all the objects can be image-sensed at once. As a value 705, an integral value is held, which indicates whether any moving image has been acquired at the camera angle designated by the picture switching unit 103. If this value is 1, it indicates that a moving image at the designated camera angle has been acquired. If the value is 0, it indicates that no such an image has been acquired.

Figure 10:
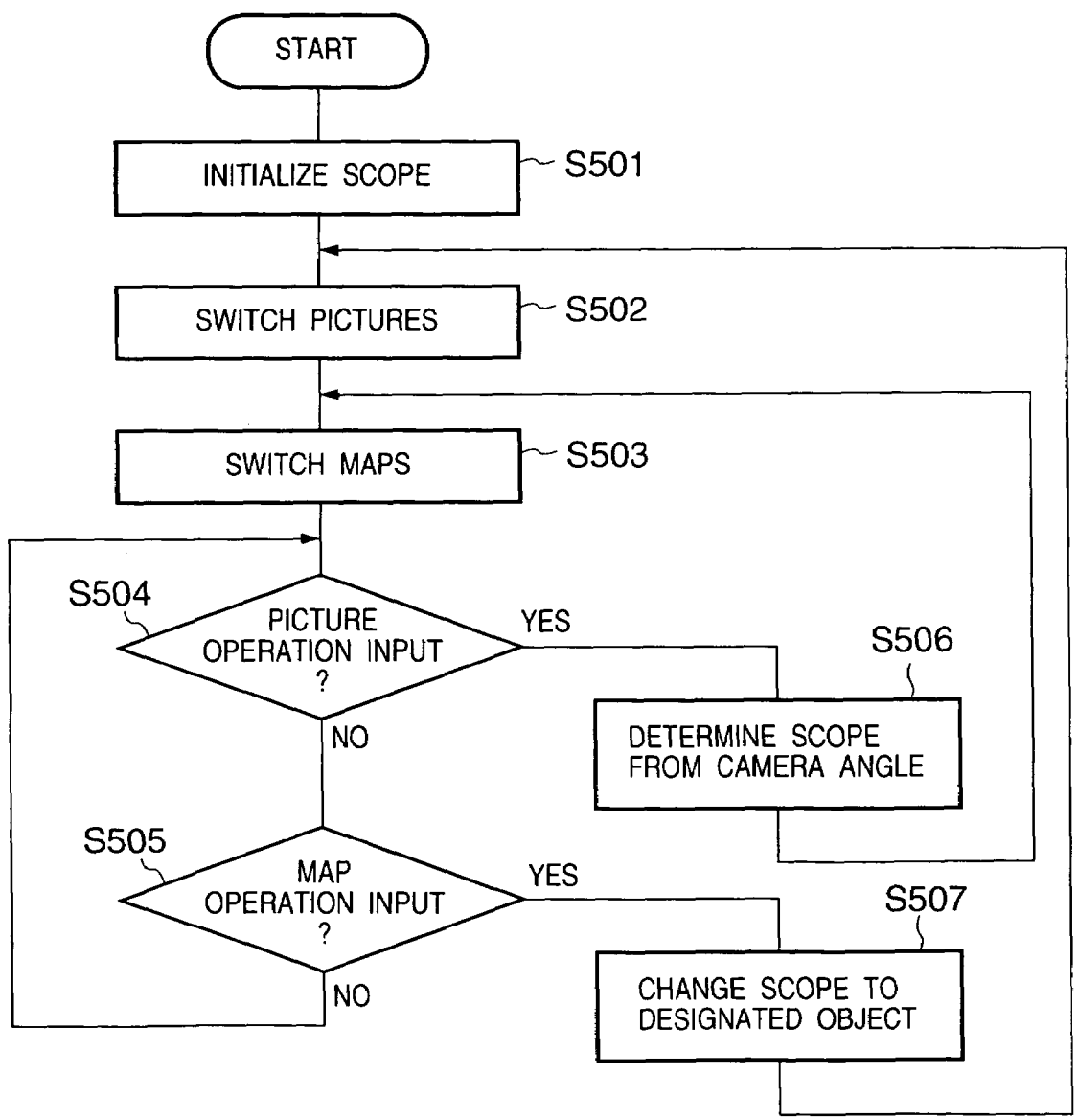
FIG. 10 is a flow chart showing information display processing according to the third embodiment.

Note that a procedure for information display processing in this embodiment is the same as that in the flow chart of FIG. 10 except for the processing in step S507.

A camera angle 314 for which a map switching unit 106 gives an instruction to display is displayed in the following colors. If the value 704 is 0, the camera angle is displayed in red. If the value 704 is 1, the display color the camera angle changes in accordance with the value 705. If the value

705 is 1, the display color is blue. If the value 705 is 0, the display color is yellow. Note that display color processing for the camera angle 314 is performed in step S507 in FIG. 10.

In the third and fourth embodiments, for the sake of descriptive convenience, scopes are switched by only picture operation and map operation. However, the present invention is not limited to this, and each embodiment may also include a document switching unit 109 as in the first and second embodiments. For example, a method of preparing a list of objects and selecting an object as a scope from the list is available.

Fifth, Sixth, and Seventh Embodiments

There is provided a camera controller designed to control a camera with a camera angle at which an arbitrary object designated on a map is to be image-sensed and perform camera control to acquire information identifying an object image-sensed at an arbitrary camera angle.

Figure 13:
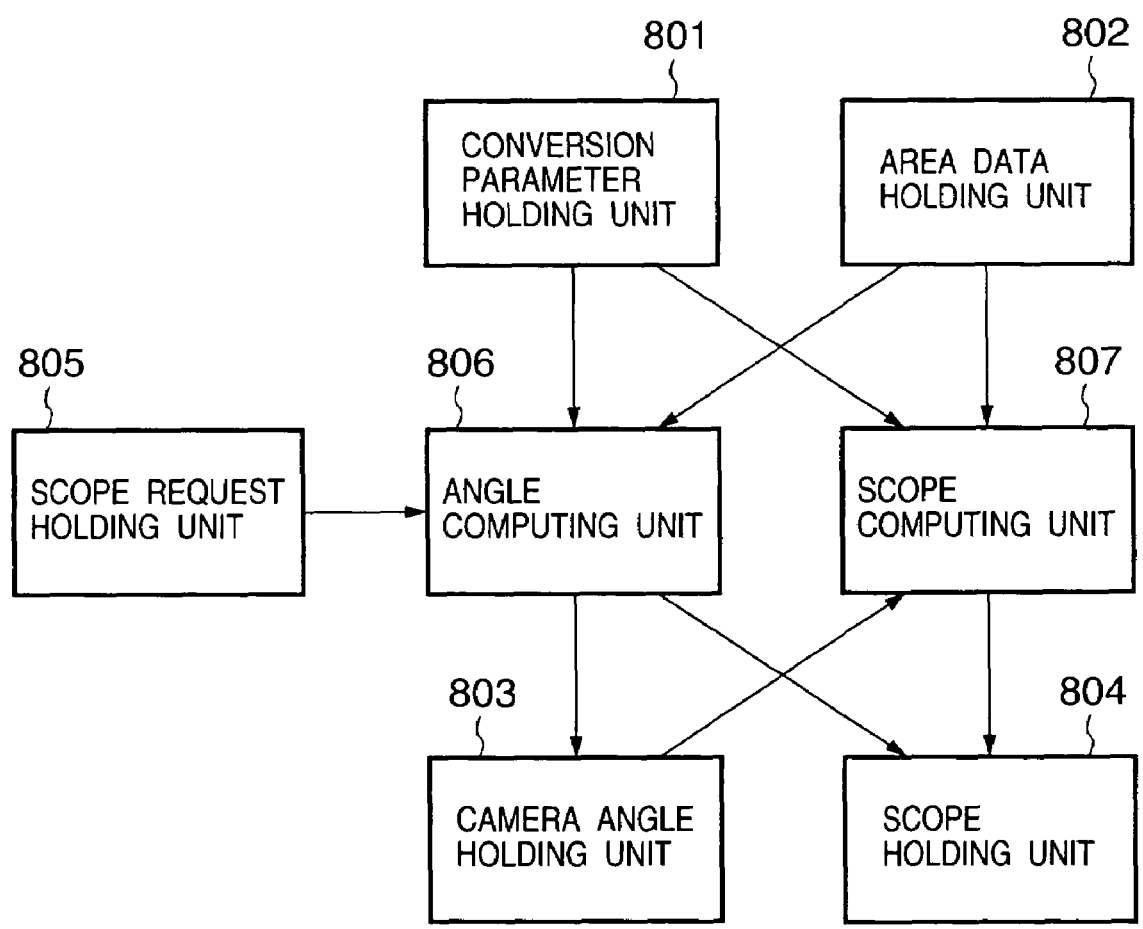
FIG. 13 is block diagram showing the basic arrangement of a camera controller according to the fifth embodiment.

FIG. 13 is a block diagram showing the basic arrangement of a camera controller according to the fifth embodiment of the present invention.

Referring to FIG. 13, reference numeral 801 denotes a conversion parameter holding unit for holding parameters used for conversion between the coordinate system of the camera and the coordinate system of a map; 802, an area data holding unit for holding data describing the area occupied by an object on a map in the coordinate system of the map; 803, a camera angle holding unit for holding the angle data of the camera; and 804, a scope holding unit for holding a list of scopes which are objects currently image-sensed by the camera.

Reference numeral 805 denotes a scope request holding unit for holding a list of objects that are newly requested to be image-sensed by the camera; 806, an angle computing unit for obtaining a camera angle at which the objects held in the scope request holding unit 805 are simultaneously image-sensed, by using the data in the conversion parameter holding unit 801 and area data holding unit 802, and holding the new angle in the camera angle holding unit 803; and 807, a scope computing unit for obtaining an object image-sensed at the camera angle held in the camera angle holding unit 803 by using the data in the conversion parameter holding unit 801 and area data holding unit 802, and holding the object as a scope in the scope holding unit 804.

Figure 14:
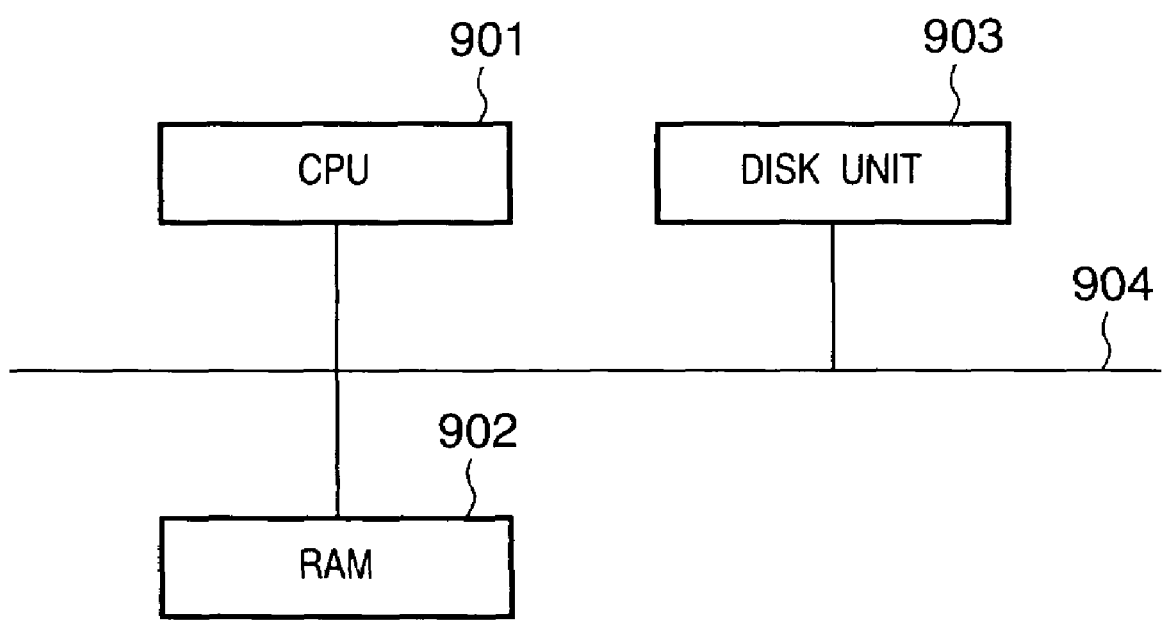
FIG. 14 is a block diagram showing a practical arrangement of the camera controller according to the fifth embodiment.

FIG. 14 shows a practical arrangement of the camera controller of this embodiment.

Referring to FIG. 14, reference numeral 904 denotes a CPU that operates in accordance with a program for implementing a procedure to be described later; 902, a RAM for providing the camera angle holding unit 803, the scope holding unit 804, the scope request holding unit 805, and a storage area required for operation of the program; 903, a disk unit for holding the conversion parameter holding unit 801, the area data holding unit 802, and a program for implementing a procedure to be described later; and 904, a bus.

Figure 15:
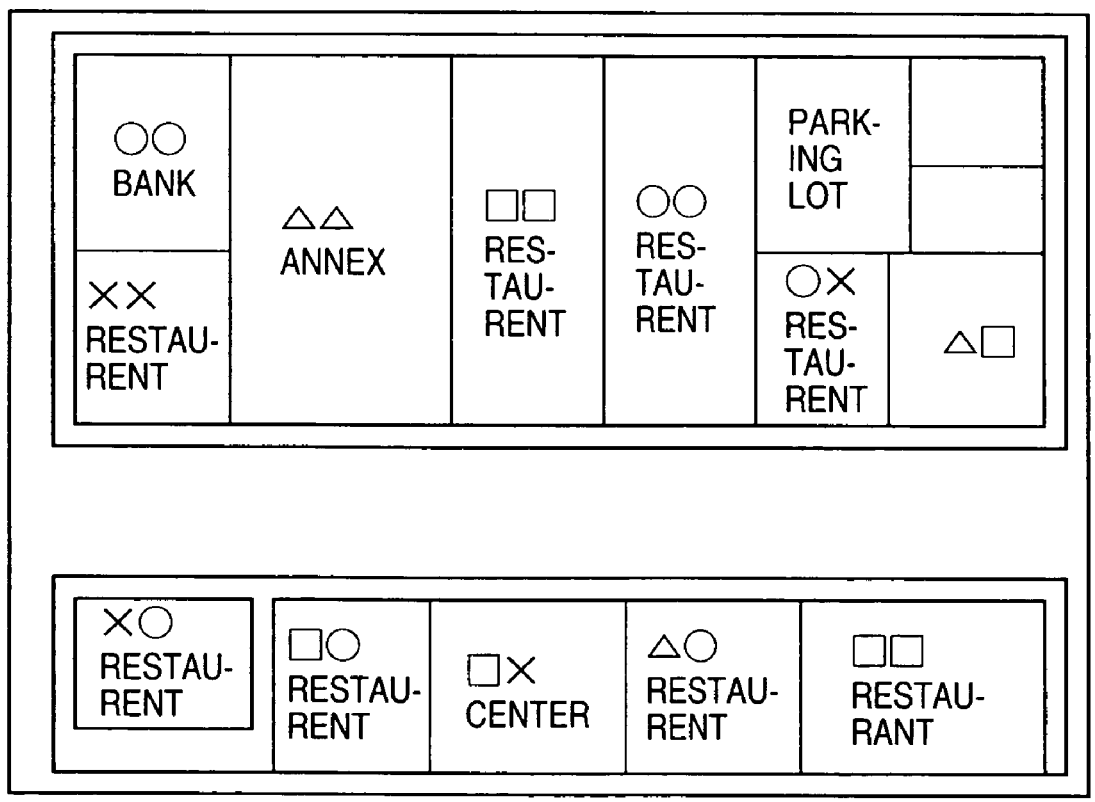
FIG. 15 is a view showing a display example according to the fifth embodiment.

FIG. 15 shows an example of a map on which area data is based. Buildings on this map are set as objects. Integral values (numbers) set for the respective areas, e.g., the area of ΔΔ annex and the like are identical to the values 1 to 13 in FIG. 3 in the first embodiment.

FIG. 16 shows an example of the data structure of the area data holding unit 802.

Referring to FIG. 16, each row corresponds to one objet. A column 501 is an area for holding the number of an object which a corresponding row describes. Column 502 is an area for holding a list of combinations of X- and Y-coordinates of the vertexes of a polygon representing the area of an object which a corresponding row describes. In the map coordinate system, the upper left corner of the map is set as the origin, the X-axis is set in the horizontal direction with the right direction being a positive direction, and the Y-axis is set in the vertical direction with the downward direction being a positive direction.

A real space expressed on a map is expressed in a coordinate system having the X-axis and Y-axis expressed in the same coordinates as those of the map and the Z-axis set in the direction perpendicular to the origin of the map with the upward direction being a positive direction.

In the camera coordinate system, the imaging point of the camera is set as the origin, an axis along which the image-sensing direction of the image-sensing axis becomes a positive direction when the panning and tilt values of the camera are 0 is set as the Z-axis, a line intersecting a panning plane in a plane that passes through the imaging point and is perpendicular to the Z-axis is set as the X-axis (with the right direction being a positive direction), and a line intersecting a tilt plane is set as the Y-axis (with the upward direction being a positive direction). Assume that the X-axis of the camera coordinate system is always parallel to a horizontal plane. That is, the camera is not tilted in the horizontal direction.

Let $\alpha$ be the angle defined by a line obtained by projecting the Z-axis of the camera coordinate system on the X-Y plane of the map coordinate system and the Y-axis of the map coordinate system, and $\beta$ be the angle defined by a line along which the Y-Z plane of the camera coordinate system intersects a horizontal plane and the Z-axis of the camera coordinate system. In addition, the coordinate value of the installation position of the camera in the map coordinate system is represented by (XC, KC, ZC).

Figure 17:
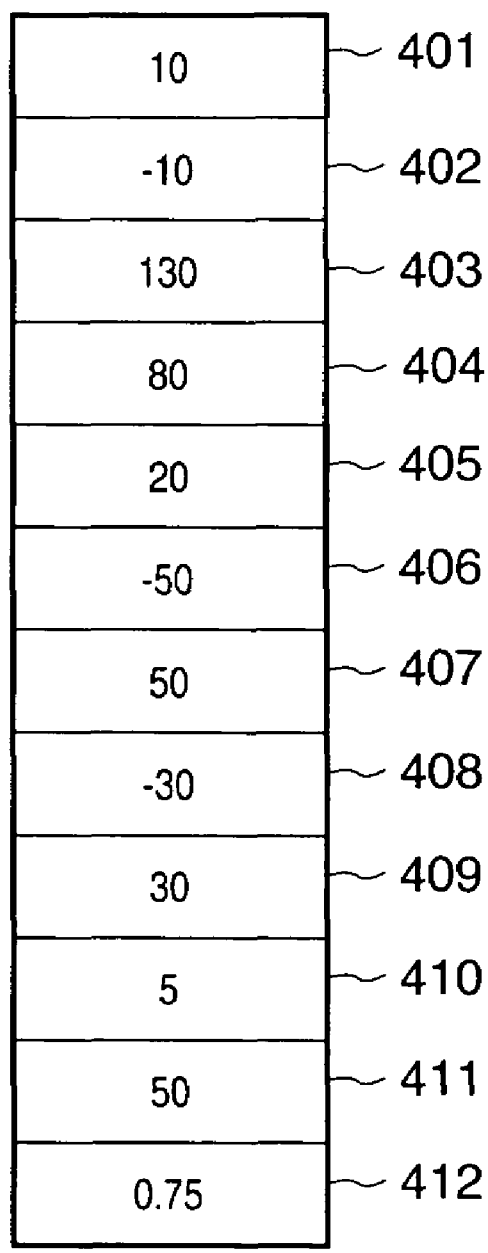
FIG. 17 is a view showing the arrangement of a conversion parameter holding unit according to the fifth embodiment.

FIG. 17 shows an example of the data structure of the conversion parameter holding unit 801.

Referring to FIG. 17, reference numeral 401 denotes an area for holding the value $\alpha$; 402, an area for holding the value $\beta$; 403, an area for holding the value XC; 404, an area for holding the value YC; and 405, an area for holding the value ZC.

Reference numeral 406 denotes an area for holding a value Pl expressing the panning limit value of the camera in the left direction in degrees; 407, an area for holding a value Pr expressing the panning limit value of the camera in the right direction in degrees; 408, an area for holding a value Td expressing the tilting limit value of the camera in the downward direction in degrees; 409, an area for holding a value TU expressing the tilting limit value of the camera in the upward direction in degrees; 410, an area for holding a value qt expressing the zooming limit value of the camera on the telephoto side in degrees of field angle in the panning direction; 411, an area for holding a value qw expressing the zooming limit value of the camera on the wide-angle side in degrees of field angle in the panning direction; and 412, an area for holding a ratio r of the field angle of the camera in the panning direction to the field angle in the tilting direction.

The values in the areas 401 to 405 are set when this apparatus is constructed. The values in the areas 406 to 412 are acquired in advance from a camera to be used.

Figure 18:
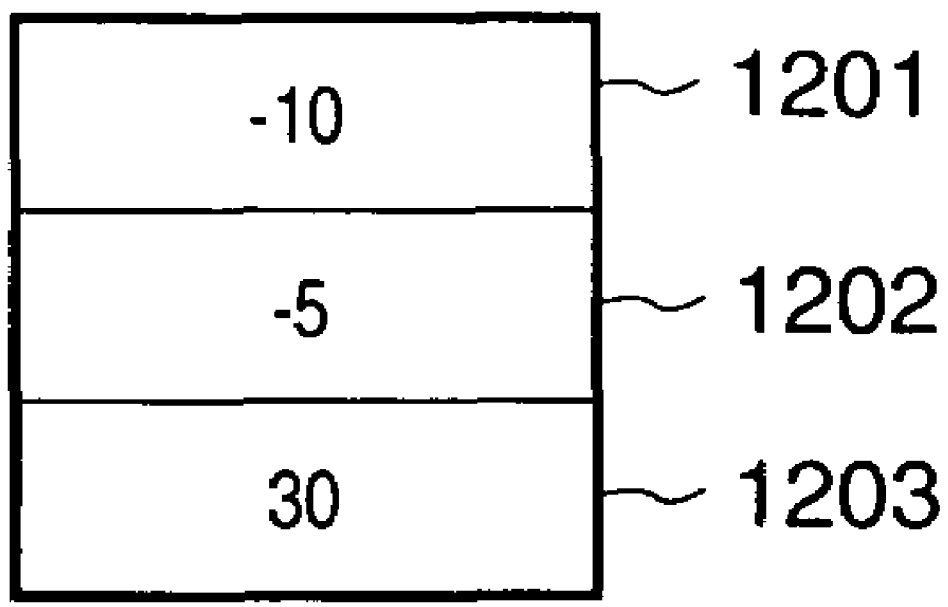
FIG. 18 is a view showing the arrangement of an image-sensing condition holding unit according to the fifth embodiment.

FIG. 18 shows an example of the data structure of the camera angle holding unit 803.

Referring to FIG. 18, reference numeral 1201 denotes an area for holding a panning value p of the camera which is expressed in degrees with the initial position of the camera being 0, and a position in the right direction being a positive value; 1202, an area for holding a tilt value t of the camera which is expressed in degrees with the initial position of the camera being 0, and a position in the upward direction being a positive value; and 1203, an area for holding a zoom value q of the camera which is expressed as the field angle of the camera in degrees.

Figure 19:
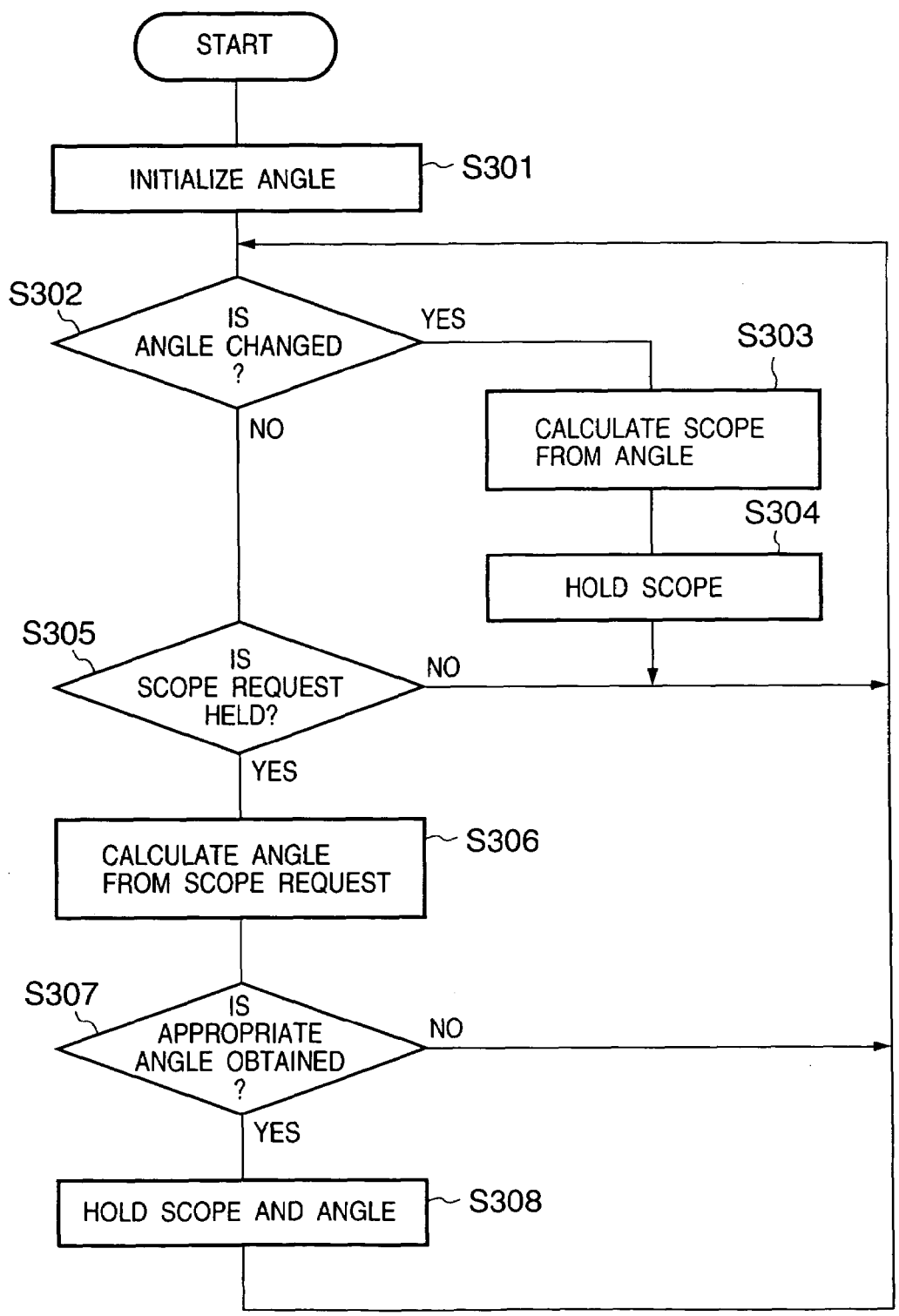
FIG. 19 is a flow chart showing processing according to the fifth embodiment.

A procedure for processing in this embodiment will be described next with reference to the flow chart of FIG. 19.

First of all, initialization is performed in step S301. The scope holding unit 804 is emptied, and predetermined values are set in the camera angle holding unit 803. Examples of the predetermined values are p=0, t=0, and q=30. The flow then advances to step S302.

In step S302, it is checked whether the angle value held in the camera angle holding unit 803 is changed. If YES in step S302, the flow advances to step S303. If NO in step S302, the flow advances to step S305. If, however, the angle value is changed by the scope computing unit 807, the same operation as that performed when the angle value is not changed is performed. In step S303, on the basis of the new camera angle value, a scope as a list of objects image-sensed at the angle is computed. This calculation method will be described in detail later. The flow then advances to step S304.

In step S304, the scope value obtained in step S303 is held in the scope holding unit 804. The flow returns to step S302. In step S305, it is checked whether a scope request is held in the scope request holding unit 805. If YES in step S305, the flow advances to step S306. If NO in step S305, the flow returns to step S302. In step S306, a camera angle, of camera angles at which all the objects listed as objects corresponding to the scope request can be image-sensed, at which the zooming value is closest to the telephoto end is obtained, and the contents of the scope request holding unit 805 are erased. This calculation method will be described in detail later. The flow then advances to step S307.

In step S307, is it checked whether an appropriate angle is obtained in step S306. If YES in step S307, the flow advances to step S308. If NO in step S307, the flow returns to step S302. In step S308, the camera angle obtained in step S306 is held in the camera angle holding unit 803, and the value of the scope request used for the computation is held in the scope holding unit 804. The flow then returns to step S302.

The method of obtaining an image-sensed object from the camera angle will be described in detail next.

Consider each object On (n represents the number of each object). A side of the area of a given object that can be viewed from the camera without being hidden behind another object is extracted. In a vertical plane including this side, a rectangle formed by an area with a predetermined height from the side is represented by Sn. Let Rn be a rectangle formed with the same topology as that of the original rectangle by using points at which straight lines connecting the respective vertexes of the rectangle Sn to the origin of the camera coordinate system intersect a plane expressed by z=1 in the camera coordinate system. That is, if a vertex of the rectangle Sn is expressed by (xs, ys, zs), a corresponding vertex of the rectangle Rn is expressed by (xs/zs, ys/zs, 1).

Although a plurality of such rectangles may be set for one object, one rectangle is set for each object in this case for the sake of simplicity. This assumption holds in the case shown in FIGS. 15 and 17. Assume that a plurality of rectangles are set. Even in this case, no problem arises if a graphic pattern obtained by overlaying the rectangles is handled as the rectangle Rn in the following processing.

In this case, the coordinate value of a rectangle must be converted from the map coordinate system to the camera coordinate system. This conversion is performed by using the values in the conversion parameter holding unit 801 as follows. If a given point is expressed by (xm, ym, zm) in the map coordinate system, the expression (xv, yv, zv) of the same point in the camera coordinate system is obtained by:

$xv = \cos\alpha(xm - Xc) + \sin\alpha(zm - Zc)$ $yv = \sin\alpha \sin\beta(xm - Xc) + \cos\beta(ym - Yc) - \cos\alpha \sin\beta(zm - Zc)$ $zv = \sin\alpha \cos\beta(xm - Xc) - \sin\beta(ym - Yc) - \cos\alpha \cos\beta(zm - Zc)$ (1)

Then, a rectangle A obtained by projecting the area image-sensed by the camera on a plane expressed by z=1 is obtained. The rectangle A is an area enclosed with the following four straight lines:

$x = \tan(p - q/2)$ $x = \tan(p + q/2)$ $x = \tan(t - rq/2)$ $x = \tan(t + rq/2)$ (2)

With regards to all the objects, it is checked whether the rectangles Sn and A intersect each other. If the rectangles Sn and A intersect, the corresponding object is included in the scope.

With the above processing, a scope can be obtained from the camera angle.

The method of obtaining a camera angle from a scope request will be described in detail next.

Letting B be a graphic pattern obtained by overlaying the rectangles Rn of all objects included in s scope request, and xmin, xmax, ymin, and ymax be the maximum and minimum values of the X- and Y-coordinates of a point in the graphic pattern B, a camera angle is determined as follows:

$p = (\arctan x\,\min + \arctan x\,\max)/2$ $t = (\arctan y\,\min + \arctan y\,\max)/2$ $q = \max\,[(\arctan x\,\min - \arctan x\,\max), \{(\arctan y\,\max - \arctan y\,\min)/r\}]$ (3)

where max is a function taking the maximum of an argument.

If pl≦p≦pr and td≦t≦tu and qt≦q≦qw, the above value is set as a new camera angle.

In the fifth embodiment, all conversion parameters are provided in advance. However, the present invention is not limited to this, and some of the parameters may be generated.

Figure 20:
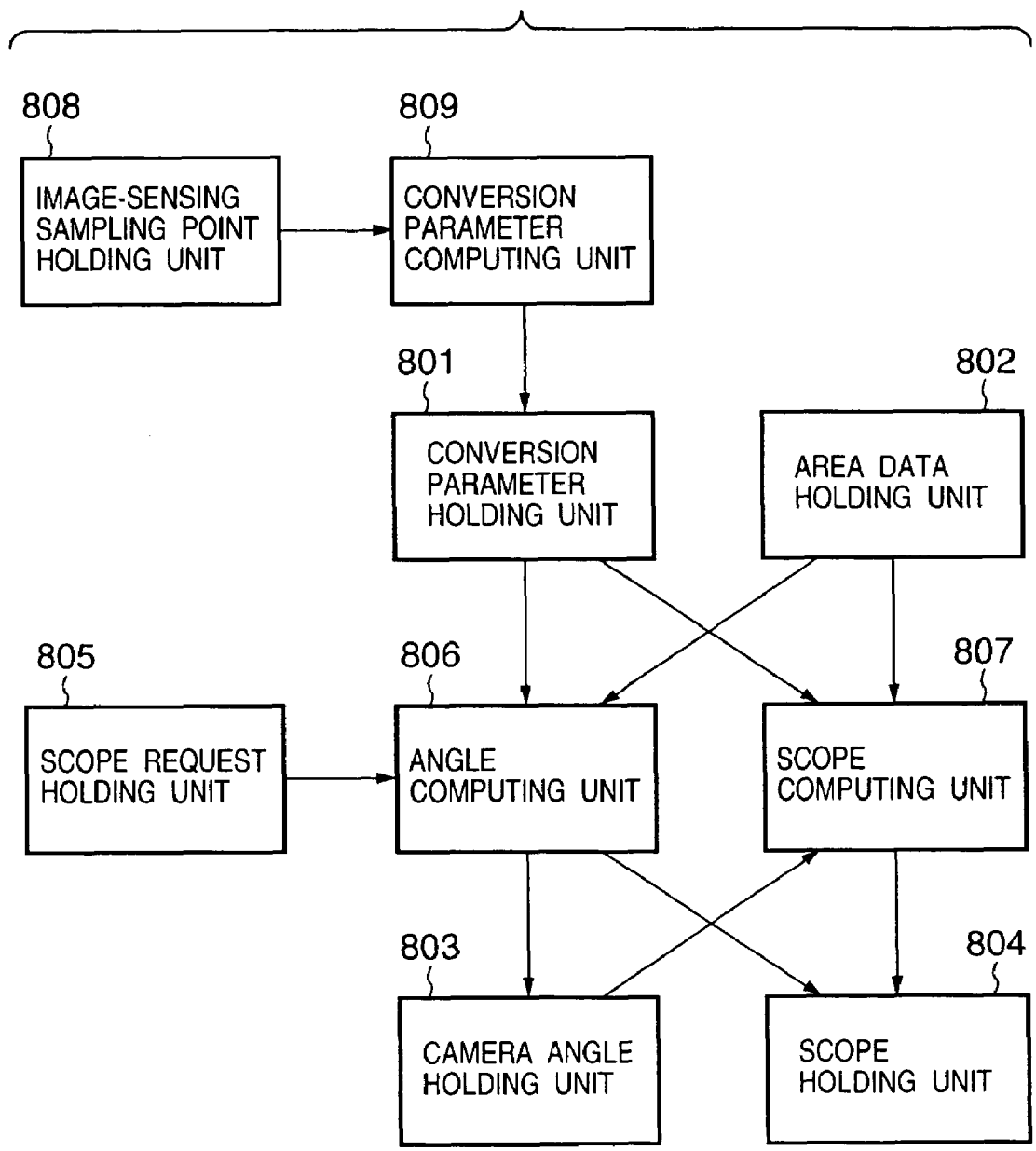
FIG. 20 is a block diagram showing the basic arrangement of a camera controller according to the sixth embodiment.

FIG. 20 is a block diagram showing the basic arrangement of a camera controller for obtaining the above values α, β, and Zc by using image-sensing sampling points according to the sixth embodiment of the present invention.

Referring to FIG. 20, reference numeral 808 denotes an image-sensing sampling point holding unit for holding image-sensing sampling points; and 809, a conversion parameter computing unit for obtaining some conversion parameters from the image-sensing sampling points held in the image-sensing sampling point holding unit 808 and other parameters held in the conversion parameter holding unit 801.

The arrangement of the remaining portion is the same as that shown in FIG. 13.

The process of obtaining conversion parameters from image-sensing sampling points will be described below. Other processes are the same as in the case shown in FIG. 13.

An image-sensing sampling point is a combination of a panning value, a tilt value, and the X- and Y-coordinates of the image-sensing position which are set when image-sensing is performed by a camera such that a given position on the surface of the earth coincides with the center of a picture taken by the camera. Three such points are prepared, and each point is represented by (Pn, Tn, Xn, Yn) (n=0, 1, 2).

Even if all the value $\alpha$, $\beta$, and Zc are unknown, these values can be obtained from the above image-sensing sampling points as follows:

$$\alpha = \arctan\{(-b + \sqrt{(b^2 - 4ac)}/2a\} \quad (4)$$

for $-90 \leq \alpha \leq 90$

In addition, $a$, b, and c are given as follows:

$$a = (X0 - X2)(Z1 \tan P0 - Z0 \tan P1)\tan P2 - (X0 - X1)(Z2 \tan P0 - Z0 \tan P2)\tan P1$$

$$b = (X0 - X2)(X1 \tan P0 - X0 \tan P1)\tan P2 + (Z2 - Z0)(Z1 \tan P0 - Z0 \tan P1)\tan P2 - (X0 - X1)(X2 \tan P0 - X0 \tan P2)\tan P1 - (Z1 - Z0)(Z2 \tan P0 - Z0 \tan P2)\tan P1$$

$$c = (Z2 - Z0)(X1 \tan P0 - X0 \tan P1)\tan P2 - (Z1 - Z0)(X2 \tan P0 - X0 \tan P2)\tan P2 \quad (5)$$

$$\beta = \arcsin[\{X0 \tan T0 \tan P1 - X1 \tan T1 \tan P0\} \cos \alpha + \{Z0 \tan T0 \tan P1 - Z1 \tan T1 \tan P0\} \sin \alpha\}]/[\{(X0 - X1)\sin \alpha + (Z1 - Z0)\cos \alpha\} \tan P0 \tan P1\}]$$

$$Zc = (X0 \sin \alpha - Z0 \cos \alpha)\tan \beta - [\{(X0 \cos \alpha + Z0 \sin \alpha)\tan T0\} \tan T0/\tan P0 \cos \beta] \quad (6)$$

The seventh embodiment of the present invention will be described next.

In the fifth and sixth embodiments, the values $\alpha$, $\beta$, and Zc are obtained from three image-sensing sampling points. However, the present invention is not limited to this. Another combination of input and output values that can be calculated may be calculated. For example, values Xc and Yc can be further obtained from four sampling points.

According to the above description, another apparatus sets and uses an angle to be held in the angle holding unit 803 and a scope to be held in the scope holding unit 805. However, the present invention is not limited to this, and these operations may be performed within this apparatus.

Figure 21:
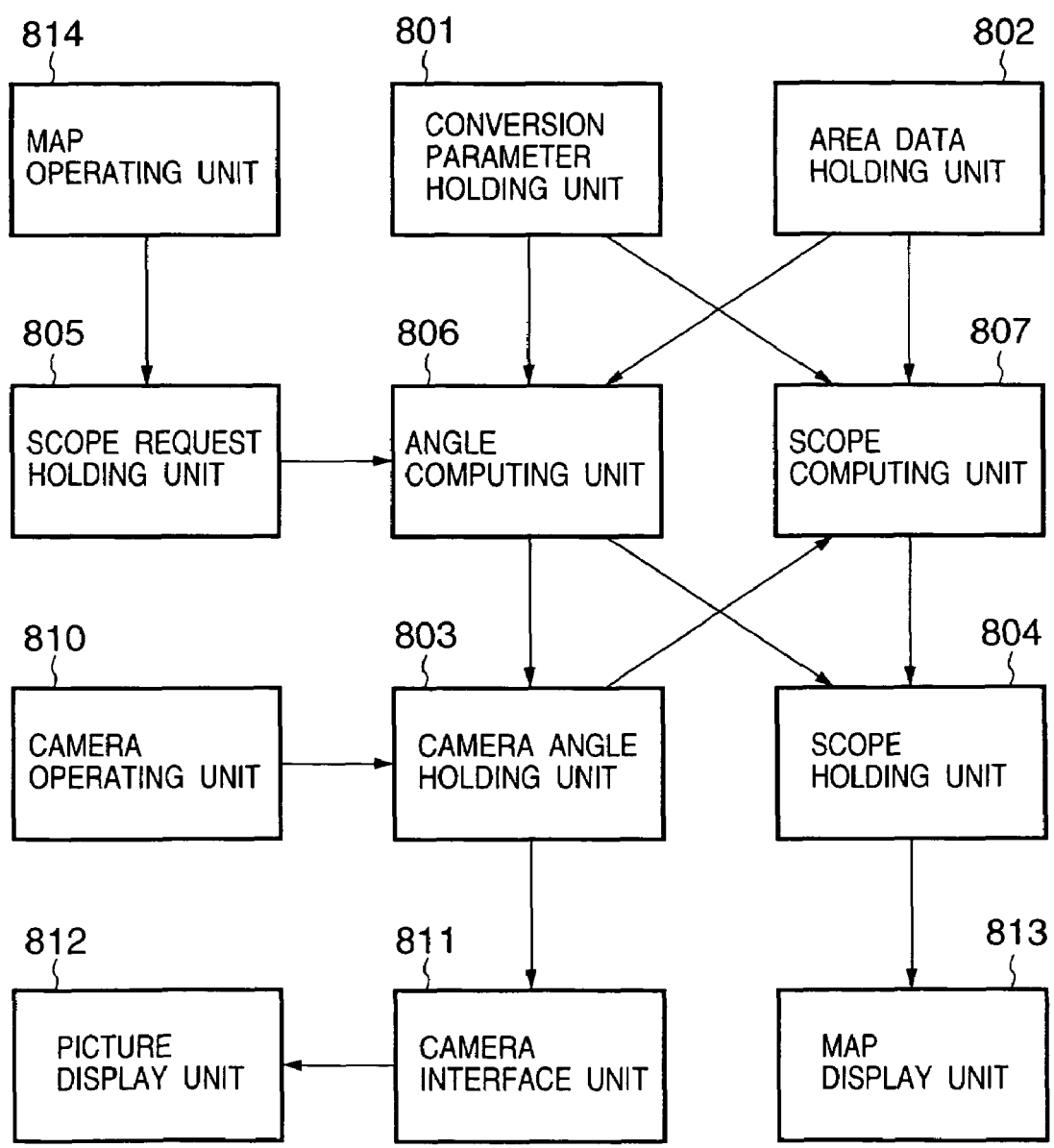
FIG. 21 is a block diagram showing the basic arrangement of a camera controller according to the seventh embodiment.

FIG. 21 is a block diagram showing the basic arrangement of a camera controller according to the seventh embodiment like the one described above.

Referring to FIG. 21, reference numerals 801 and 807 denote units identical to those in FIG. 13; 810, a camera operating unit for receiving information representing camera angle changing operation and holding a new angle in an angle holding unit 803; 811, a camera interface unit for notifying the camera of an instruction to set it to the camera angle held in the angle holding unit 803; 812, a picture display unit for displaying a picture acquired through the camera interface unit; 813, a map display unit for displaying a map and highlighting the area of an object belonging to the scope held in a scope holding unit 804; and 814, a map operating unit for receiving information representing object selecting operation on the map and holding a list of selected objects in a scope request holding unit 805.

Figure 22:
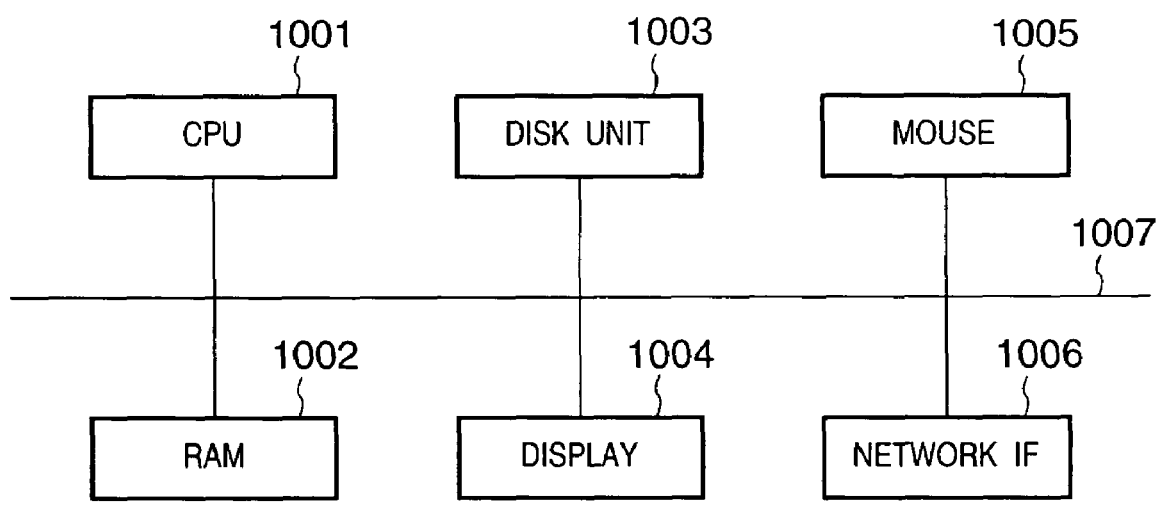
FIG. 22 is a block diagram showing a practical arrangement of the camera controller according to the seventh embodiment.

FIG. 22 shows a practical arrangement of the camera controller of this embodiment.

Referring to FIG. 22, reference numeral 1001 denotes a CPU that operates in accordance with a program for implementing a procedure to be described later; 1002, a RAM for providing the angle holding unit 803, the scope holding unit 804, the scope request holding unit 805, and a storage area required for operation based on the above program; 1003, a disk unit for holding the conversion parameter holding unit 801, the area data holding unit 802, and a program for implementing a procedure to be described later; 1004, a display for output display information from the picture display unit 812 and map display unit 813; 1005, a mouse that is used to input operation commands to the camera operating unit 810 and map operating unit 814; 1006, a network interface for implementing communication between the camera interface unit 811 and the camera; and 1007, a bus.

Figure 23:
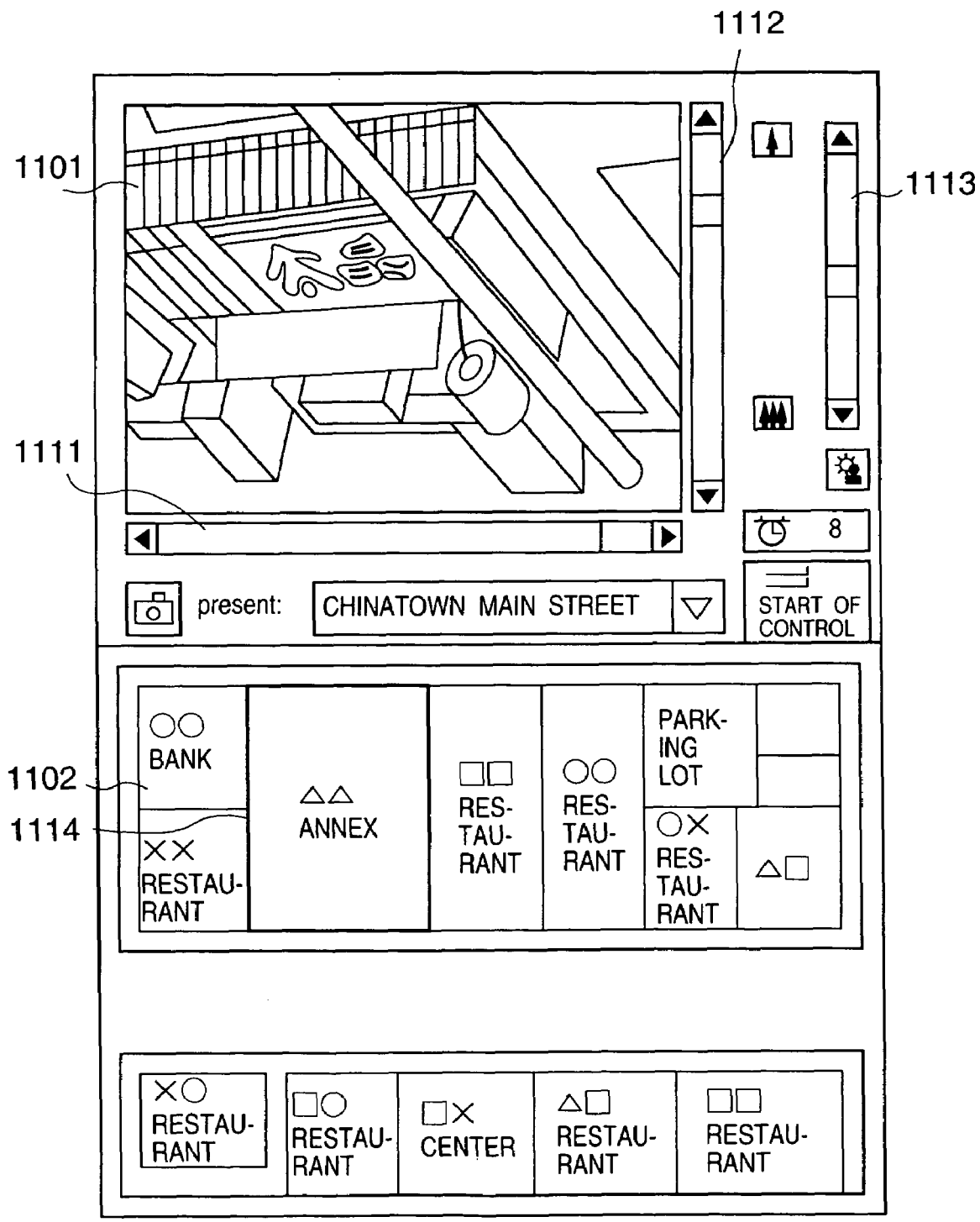
FIG. 23 is a view showing a display example on a display according to the seventh embodiment.

FIG. 23 shows an example of information displayed on the display of the camera controller according to this embodiment.

Referring to FIG. 23, reference numeral 1101 denotes an input interface for receiving pictures output from the picture display unit 812 and inputting information to the camera operating unit 810. When the user moves slide bars 1111, 1112, and 1113 above the input interface 1101, information representing picture operation can be transferred to the camera operating unit 810. The user can laterally move the camera by laterally moving the slide bar 1111. The user can move the camera vertically by vertically moving the camera by vertically moving the bar 1112. The user can change the zoom value of the camera by vertically moving the slide bar 1113.

Reference numeral 1102 denotes a map output from the map display unit 813. All objects as a scope held in the scope holding unit 804 are displayed on the map, and the area of an object of the scope is indicated by a highlighted portion 1114 on the map. When the user clicks on the area of a store on the map 1102, information representing this map operation can be transferred to the map operating unit 813. The number (integral value) of the store corresponding to the clicked area is held in the scope holding unit 805.

In the above embodiments, angle computation is performed to obtain a camera angle covering all buildings. However, the present invention is not limited to this. An angle covering part of a building may be obtained. In, for example, obtaining a camera angle, the height of a building may be set to smaller than the value used for scope computation or the measured value, and an angle at which only a portion near the surface of the earth can be image-sensed may be obtained.

According to the above description, scopes are switched by performing only picture operation and map operation. However, the present invention is not limited to this. As in the first embodiment, this apparatus may also include a document switching means. For example, a list of objects is prepared, and an object as a scope is selected from this list, and information about the object belonging to the scope is displayed.

A storage medium according to this embodiment will be described next.

The first to seventh embodiments shown in the accompanying drawings can be implemented by hardware circuits. When each embodiment is to be implemented by a computer system constituted by a CPU and a memory such as a disk unit, the memory constitutes the storage medium of the present invention. This storage medium stores programs for executing the processing and operation described above in each embodiment with reference to the flow charts and the like.

As this storage medium, for example, a ROM, semiconductor memory such as a RAM, optical disk, magneto-optical disk, or a magnetic recording medium may be used. These media may be formed into a CD-ROM, FD, magnetic card, magnetic tape, nonvolatile memory card, and the like.

The same functions and effects as those of each embodiment described above can be obtained, and the objects of the present invention can be achieved by using this storage medium in a system or apparatus other than the systems shown in the accompanying drawings, and causing the system or computer to read out and execute the program codes stored in the storage medium.

The same functions and effects as those of each embodiment described above can be obtained, and the objects of the present invention can be achieved when an OS running on the computer executes some or all of processing operations, or when a CPU or the like arranged in a function extension board or a function extension unit executes some or all of processing operations on the basis of instructions of the program codes read out from the storage medium after the program codes are written in a memory of the extension board or unit inserted/connected in/to the computer.

As has been described above, according to each embodiment described above, information about an object image-sensed by the camera can be automatically presented, and an object described by information browsed by the user can be automatically image-sensed by the camera and presented while the use is browsing the information. The user can therefore easily acquire information while seeing the current picture of an object, or can easily acquire a picture while browsing information, without performing any specific operation.

In addition, according to each embodiment described above, an object for which an instruction to image-sense is given and an angle at which the object is actually image-sensed are presented in a readable form, and the image-sensing condition of the camera can also be presented.

Furthermore, according to this embodiment, when an arbitrary object on a map is designated, the angle of a camera for image-sensing the object can be controlled. When an arbitrary camera angle is set, information identifying an object image-sensed at the arbitrary angle can be obtained.

As many apparently widely different embodiments of the present invention can be made without departing from the spirit and scope thereof, it is to be understood that the invention is not limited to the specific embodiments thereof except as defined in the appended claims.

What is claimed is:

1. An information presenting system comprising:
   scope holding means for holding a scope indicating an object to which a user is currently giving attention in accordance with at least one of a picture sensed by a camera, a map indicating a position of the camera, and a text document;
   picture operating means for changing an image-sensing range of the camera;
   first instruction means for instructing the camera to switch display pictures when the image-sensing range of the camera is changed by said picture operating means or the scope held in said scope holding means is changed, and instructing said scope holding means to hold a new scope corresponding to a new image-sensing range when the image-sensing range of the camera is changed by said picture operating means;
   picture display means for displaying a picture within the image-sensing range of the camera which is designated by an instruction from said first instruction means;
   map operating means for changing the scope in said scope holding means by designating an object on the map by giving an instruction;
   second instruction means for updating display of a symbol indicating the image-sensing range of the camera which is displayed on the map when the scope is changed by said map operating means or the scope held in said scope holding means is changed, and instructing said scope holding means to hold a new scope when the scope is changed by said map operating means;
   map display means for displaying a map designated by an instruction from said second instruction means;
   document operating means for changing a display document by operating a text document;
   third instruction means for giving an instruction to switch documents when the display document is changed by said document operating means or the scope held in said scope holding means is changed, and instructing said scope holding means to hold a new scope when the display document is changed by said document operating means; and
   document display means for displaying the document designated by an instruction from said third instruction means.

2. The system according to claim 1, wherein if the scope held in said scope holding means is changed by said first or third instruction means, and an object corresponding to a new scope is not displayed on said map display means, said map display means is instructed to display the object.

3. The system according to claim 2, wherein said system further comprises storage means for storing maps on different reduced scales, and if the scope held in said scope holding means is changed by said first or third instruction means, and an object corresponding to a new scope is not displayed on said map display means, said second instruction means instructs said map display means to display a map on the smallest reduced scale that can display a corresponding new image-sensing range.

4. The system according to claim 2, wherein if the scope held in said scope holding means is changed by said first or third instruction means, and an object corresponding to a new scope is not displayed on said map display means, said second instruction means instructs said map display means to scroll the displayed map so as to display a corresponding new image-sensing range.

5. The system according to claim 1, wherein if there are a plurality of scopes to be held in said scope holding means, said first instruction means designates control on the camera to image-sense all objects corresponding to the scopes.

6. The system according to claim 5, wherein if the camera cannot simultaneously image-sense the plurality of objects corresponding to the scopes held in said scope holding means, said first instruction means designates control on the camera to image-sense each object at predetermined time intervals.

7. The system according to claim 5, wherein if the camera cannot simultaneously image-sense the plurality of objects corresponding to the scopes held in said scope holding means, said first instruction means displays a panoramic image obtained by image-sensing the respective objects.

8. The system according to claim 1, wherein if the camera cannot image-sense the object corresponding to the scope held in said scope holding means, said first instruction means displays a picture taken in advance.

9. The system according to claim 1, wherein if one scope is held in said scope holding means, said third instruction means instructs said document display means to display a text document having information about an object corresponding to the scope, and if a plurality of scopes are held in said scope holding means, said third instruction means instructs said document display means to display only anchors corresponding to the scopes.

10. The system according to claim 1, wherein said system further comprises acquiring means for acquiring information about a current image-sensing range of the camera, and said second instruction means changes a display mode of a symbol indicating the image-sensing range of the camera depending on whether the information about the current image-sensing range of the camera coincides with the image-sensing range of the camera which is designated by an instruction from said first instruction means.

11. An information presenting method comprising:
a scope holding step of holding a scope indicating an object to which a user is currently giving attention in accordance with at least one of a picture sensed by a camera, a map indicating a position of the camera, and a text document;
a picture operating step of changing an image-sensing range of the camera;
a first instruction step of instructing the camera to switch display pictures when the image-sensing-range of the camera is changed in the picture operating step or the scope held in the scope holding step is changed, and giving an instruction to hold a new scope corresponding to a new image-sensing range in the scope holding step when the image-sensing range of the camera is changed in the picture display step;
a picture display step of displaying a picture within the image-sensing range of the camera which is designated by an instruction in the first instruction step;
a map operating step of changing the scope in the scope holding step by designating an object on the map by giving an instruction;
a second instruction step of updating display of a symbol indicating the image-sensing range of the camera which is displayed on the map when the scope is changed in the map operating step or the scope held in the scope holding step is changed, and giving an instruction to hold a new scope in the scope holding step when the scope is changed in the map operating step;
a map display step of displaying a map designated by an instruction from in the second instruction step;
a document operating step of changing a display document by operating a text document;
a third instruction step of giving an instruction to switch documents when the display document is changed in the document operating step or the scope held in the scope holding step is changed, and giving an instruction to hold a new scope in the scope holding step when the display document is changed in the document operating step; and
a document display step of displaying the document designated by an instruction in the third instruction step.

12. The method according to claim 11, wherein if the scope held in the scope holding step is changed by the first or third instruction step, and an object corresponding to a new scope is not displayed on the map display step, the map display step comprises instructing to display the object.

13. The method according to claim 12, wherein the method further comprises the storage step of storing maps on different reduced scales, and the second instruction step comprises, if the scope held in the scope holding step is changed in the first or third instruction step and an object corresponding to a new scope is not displayed in the map display step, giving an instruction to display a map on the smallest reduced scale that can display a corresponding new image-sensing range in the map display step.

14. The method according to claim 12, wherein the second instruction step comprises, if the scope held in the scope holding step is changed in the first or third instruction step and an object corresponding to a new scope is not displayed in the map display step, giving an instruction to scroll the displayed map so as to display a corresponding new image-sensing range in the map display step.

15. The method according to claim 11, wherein the first instruction step comprises, if there are a plurality of scopes to be held in the scope holding step, instructing control on the camera to image-sense all objects corresponding to the scopes.

16. The method according to claim 15, wherein the first instruction step comprises, if the camera cannot simultaneously image-sense the plurality of objects corresponding to the scopes held in the scope holding step, instructing control on the camera to image-sense each object at predetermined time intervals.

17. The method according to claim 15, wherein the first instruction step comprises, if the camera cannot simultaneously image-sense the plurality of objects corresponding to the scopes held in the scope holding step, displaying a panoramic image obtained by image-sensing the respective objects.

18. The method according to claim 11, wherein the first instruction step comprises, if the camera cannot image-sense the object corresponding to the scope held in the scope holding step, displaying a picture taken in advance.

19. The method according to claim 11, wherein the third instruction step comprises, if one scope is held in the scope holding step, giving an instruction to display a text document having information about an object corresponding to the scope in the document display step, and if a plurality of scopes are held in the scope holding step, giving an instructing to display only anchors corresponding to the scopes in the document display step.

20. The method according to claim 11, wherein the method further comprises the acquiring step of acquiring information about a current image-sensing range of the camera, and the second instruction step comprises changing a display mode of a symbol indicating the image-sensing range of the camera depending on whether the information about the current image-sensing range of the camera coincides with the image-sensing range of the camera which is designated by an instruction in the first instruction step.

21. A computer-readable medium storing a program comprising program codes of:
a scope holding step of holding a scope indicating an object to which a user is currently giving attention in accordance with at least one of a picture sensed by a camera, a map indicating a position of the camera, and a text document;
a picture operating step of changing an image-sensing range of the camera;
a first instruction step of instructing the camera to switch display pictures when the image-sensing range of the camera is changed in the picture operating step or the scope held in the scope holding step is changed, and giving an instruction to hold a new scope corresponding to a new image-sensing range in the scope holding step when the image-sensing range of the camera is changed in the picture display step;

a picture display step of displaying a picture within the image-sensing range of the camera which is designated by an instruction in the first instruction step;

a map operating step of changing the scope in the scope holding step by instructing an object on the map by giving an instruction;

a second instruction step of updating display of a symbol indicating the image-sensing range of the camera which is displayed on the map when the scope is changed in the map operating step or the scope held in the scope holding step is changed, and giving an instruction to hold a new scope in the scope holding step when the scope is changed in the map operating step;

a map display step of displaying a map designated by an instruction in the second instruction step;

a document operating step of changing a display document by operating a text document;

a third instruction step of giving an instruction to switch documents when the display document is changed in the document operating step or the scope held in the scope holding step is changed, and giving an instruction to hold a new scope in the scope holding step when the display document is changed in the document operating step; and a document display step of displaying the document designated by an instruction in the third instruction step.

22. The medium according to claim 21, wherein if the scope held in the scope holding step is changed by the first or third instruction step, and an object corresponding to a new scope is not displayed on the map display step, the map display step comprises instructing to display the object.

23. The medium according to claim 22, wherein the medium further comprises a program code of the storage step of storing maps on different reduced scales, and the second instruction step comprises, if the scope held in the scope holding step is changed in the first or third instruction step and an object corresponding to a new scope is not displayed in the map display step, giving an instruction to display a map on the smallest reduced scale that can display a corresponding new image-sensing range in the map display step.

24. The medium according to claim 22, wherein the second instruction step comprises, if the scope held in the scope holding step is changed in the first or third instruction step and an object corresponding to a new scope is not displayed in the map display step, giving an instruction to scroll the displayed map so as to display a corresponding new image-sensing range in the map display step.

25. The medium according to claim 21, wherein the first instruction step comprises, if there are a plurality of scopes to be held in the scope holding step, instructing control on the camera to image-sense all objects corresponding to the scopes.

26. The medium according to claim 25, wherein the first instruction step comprises, if the camera cannot simultaneously image-sense the plurality of objects corresponding to the scopes held in the scope holding step, instructing control on the camera to image-sense each object at predetermined time intervals.

27. The medium according to claim 25, wherein the first instruction step comprises, if the camera cannot simultaneously image-sense the plurality of objects corresponding to the scopes held in the scope holding step, displaying a panoramic image obtained by image-sensing the respective objects.

28. The medium according to claim 21, wherein the first instruction step comprises, if the camera cannot image-sense the object corresponding to the scope held in the scope holding step, displaying a picture taken in advance.

29. The medium according to claim 21, wherein the third instruction step comprises, if one scope is held in the scope holding step, giving an instruction to display a text document having information about an object corresponding to the scope in the document display step, and if a plurality of scopes are held in the scope holding step, giving an instructing to display only anchors corresponding to the scopes in the document display step.

30. The medium according to claim 21, wherein the medium further comprises a program code of the acquiring step of acquiring information about a current image-sensing range of the camera, and the second instruction step comprises changing a display mode of a symbol indicating the image-sensing range of the camera depending on whether the information about the current image-sensing range of the camera coincides with the image-sensing range of the camera which is designated by an instruction in the first instruction step.

31. An information presenting system comprising:
scope holding device adapted to hold a scope indicating an object to which a user is currently giving attention in accordance with a picture sensed by a camera;
picture operating device adapted to change an image-sensing range of the camera;
control device adapted to control the camera to sense the Image-sensing range and setting a new scope corresponding to a new image-sensing range when the image-sensing range of the camera is changed by said picture operating device;
picture display device adapted to display a picture of the image-sensing range of camera; and
text display device adapted to display the text information corresponding to the scope held in the scope holding device, and switch the text information to the new text information corresponding to the new scope when the scope held in said scope holding device is changed to the new scope.

32. The system according to the claim 31, wherein the image-sensing range is determined by at least one of pan, tilt, zoom of the camera.

33. The system according to the claim 32, wherein said picture operating device changes at least one of pan, tilt, and zoom of the camera in response to the cursor operation of the user.

34. The system according to the claim 31, wherein the text information is including a hyper text document.

35. The system according to the claim 31, further comprising scope display device for displaying scope candidate names corresponding to scope candidates able to be hold by said scope holding device.

36. The system according to the claim 35, said scope displaying device displays the name area of the scope hold by said scope holding device in different condition form the other candidate name areas.

37. An information presenting system comprising:
scope holding device adapted to hold a scope indicating an object to which a user is currently giving attention in accordance with text information;
text operating device adapted to change display text information;

control device adapted to control the text Information and setting a new scope corresponding to a new text information when the display text information is changed by said text operating device;

text display device adapted to display the text information; and picture display device adapted to display a picture of an image-sensing range of a camera corresponding to the scope held in the scope holding device, and switch the display picture to a new display picture corresponding to the new scope when the scope held in said scope holding device is changed to the new scope.

38. The system according to the claim 37, wherein the image-sensing range is determined by at least one of pan, tilt, zoom of the camera.

39. The system according to the claim 37, wherein the text information is including a hyper text document.

40. The system according to the claim 39, wherein said text operating device changes the hyper text document in response to the link operation of the user.

41. The system according to the claim 37, further comprising scope display device for displaying scope candidate names corresponding to scope candidates able to be hold by said scope holding device.

42. The system according to the claim 41, said scope displaying device displays the name area of the scope hold by said scope holding device in different condition form the other candidate name areas.

43. An information presenting system comprising:

scope holding device adapted to hold a scope indicating an object to which a user is currently giving attention in accordance with at least one of a picture sensed by a camera and text information;

picture operating device adapted to change an Image-sensing range of the camera;

first instruction device adapted to instruct the camera to switch display pictures when the image-sensing range of the picture is changed by said picture operating device or the scope held in said scope holding device is changed, and instruct said scope holding device to hold a new scope, corresponding to a new image-sensing range when the image-sensing range of the camera is changed by said picture operating device;

picture display device adapted to display a picture within the image-sensing range of the camera which is designated by an Instruction from said first instruction device;

text operating device adapted to change display text information;

second instruction device adapted to give an instruction to switch text information when the display text information is changed by said text operating device or the scope held in said scope holding device is changed, and instruct said scope holding device to hold a new scope when the display text information is changed by said text operating device; and text display device adapted to display the text information designated by an instruction from said second instruction device.

44. An information presenting system comprising:

scope holding device adapted to hold a scope indicating an object to which a user is currently giving attention in accordance with at least one of a picture sensed by a camera, a position information of the sensed image, and text information;

picture operating device adapted to change the sensed picture;

first instruction device adapted to instruct to switch display pictures when the sensed picture is changed by picture operating device or the scope held in said scope holding device is changed, and instruct said scope holding device to hold a new scope corresponding to a new sensed picture when the sensed picture is changed by said picture operating device;

picture display device adapted to display a picture which is designated by an instruction from said first instruction device;

position operating device adapted to change the scope in said scope holding device by designating an object position by giving an instruction;

second instruction device adapted to update display of position information of the sensed Image which Is displayed when the scope is changed by said position operating device or the scope held in said scope holding devices: is changed, and instruct said scope holding device to hold a new scope when the scope is changed by said position operating device;

position display device adapted to display a position designated by an instruction from said second instruction device;

text operating device adapted to change a display text information;

third instruction device adapted to give an instruction to switch text information when the display text information is changed by said text operating device or the scope held in said scope holding device is changed, and instruct said scope holding device to hold a new scope when the display text information is changed by said text operating device; and text display device adapted to display the text information designated by an instruction from said third instruction device.

45. An information presenting method comprising:

a scope holding step of holding a scope indicating an object to which a user is currently giving attention in accordance with a picture sensed by a camera;

a picture operating step of changing an image-sensing range of the camera a control step of controlling the camera to sense the image-sensing range and setting a new scope corresponding to a new image-sensing range when the image-sensing range of the camera is changed in said picture operating step;

a picture display step of displaying a picture of the image-sensing range of camera; and a text display step of displaying the text information corresponding to the scope held in the scope holding step, and switching the text information to the new text information corresponding to the new scope when the scope held in said scope holding step is changed to the new scope.

46. The method according to the claim 45, wherein the image-sensing range is determined by at least one of pan, tilt, zoom of the camera.

47. The method according to the claim 46, wherein said picture operating step changes at least one of pan, tilt, and zoom of the camera in response to the cursor operation of the user.

48. The method according to the claim 45, wherein the text information is including a hyper text document.

49. The method according to the claim 45, further comprising the scope display step of displaying scope candidate names corresponding to scope candidates able to be hold in said scope holding step.

50. The method according to the claim 49, said scope displaying step displays the name area of the scope hold in said scope holding step in different condition form the other candidate name areas.

51. An information presenting method comprising:
a scope holding step of holding a scope indicating an object to which a user is currently giving attention in accordance with text information;
a text operating step of changing display text information;
a control step of controlling the text information and setting a new scope corresponding to a new text information when the display text information is changed in said text operating step;
a text display step of displaying the text information; and
a picture display step of displaying a picture of an image-sensing range of a camera corresponding to the scope held in the scope holding step, and switching the display picture to a new display picture corresponding to the new scope when the scope held in said scope holding step is changed to the new scope.

52. The method according to the claim 51, wherein the image-sensing range is determined by at least one of pan, tilt, zoom of the camera.

53. The method according to the claim 51, wherein the text information is including a hyper text document.

54. The method according to the claim 53, wherein said text operating device changes the hyper text document in response to the link operation of the user.

55. The method according to the claim 51, further comprising the scope display step of displaying scope candidate names corresponding to scope candidates able to be hold is said scope holding step.

56. The method according to the claim 55, said scope displaying step displays the name area of the scope hold in said scope holding step in different condition form the other candidate name areas.

57. An information presenting method comprising:
a scope holding step of holding a scope indicating an object to which a user is currently giving attention in accordance with at least one of a picture sensed by a camera and text information;
a picture operating step of changing an image-sensing range of the camera
a first instruction step of instructing the camera to switch display pictures when the image-sensing range of the picture is changed in said picture operating step or the scope held in said scope holding step is changed, and instructing said scope holding step to hold a new scope corresponding to a new image-sensing range when the image-sensing range of the camera is changed in said picture operating step;
a picture display step of displaying a picture within the image-sensing range of the camera which is designated by an instruction in said first instruction step;
a text operating step of changing display text information;
a second instruction step of giving an instruction to switch text information when the display text information is changed in said text operating step or the scope held in said scope holding step is changed, and instructing said scope holding step to hold a new scope when the display text information is changed in said text operating step; and
a text display step of displaying the text information designated by an instruction in said second instruction step.

58. An information presenting method comprising:
a scope holding step of holding a scope indicating an object to which a user is currently giving attention in accordance with at least one of a picture sensed by a camera, a position information of the sensed image, and text information;
a picture operating step of changing the sensed picture;
a first instruction step of instructing to switch display pictures when the sensed picture is changed in picture operating step or the scope held in said scope holding step is changed, and instructing said scope holding step to hold a new scope corresponding to a new sensed picture when the sensed picture is changed in said picture operating step;
a picture display step of displaying a picture which is designated by an instruction in said first instruction step;
a position operating step of changing the scope in said scope holding step by designating an object position by giving an instruction;
a second instruction step of updating display of position information of the sensed image which is displayed when the scope is changed in said position operating step or the scope held in said scope holding step is changed, and instructing said scope holding step to hold a new scope when the scope is changed in said position operating step;
a position display step of displaying a position designated by an instructior in said second instruction step;
a text operating step of changing a display text information;
a third instruction step of giving an instruction to switch text information when the display text information is changed in said text operating step or the scope held in said scope holding step is changed, and instructing said scope holding step to hold a new scope when the display text information is changed in said text operating step; and
a text display step of displaying the text information designated by an instruction in said third instruction step.

59. A computer-readable medium storing a program comprising program codes of:
a scope holding step of holding a scope indicating an object to which a user is currently giving attention in accordance with a picture sensed by a camera;
a picture operating step of changing an image-sensing range of the camera;
a control step of controlling the camera to sense the image-sensing range and setting a new scope corresponding to a new image-sensing range when the image-sensing range of the camera is changed in said picture operating step;
a picture display step of displaying a picture of the image-sensing range of camera; and
a text display step of displaying the text information corresponding to the scope held in the scope holding step, and switching the text information to the new text information corresponding to the new scope when the scope held in said scope holding step is changed to the new scope.

60. A computer-readable medium storing a program comprising program codes of:
a scope holding step of holding a scope indicating an object to which a user is currently giving attention in accordance with text information;
a text operating step of changing display text information;
a control step of controlling the text information and setting a new scope corresponding to a new text information when the display text information is changed in said text operating step;
a text display step of displaying the text information; and a picture display step of displaying a picture of an image-sensing range of camera corresponding to the scope held in the scope holding step, and switching the display picture to a new display picture corresponding to the new scope when the scope held in said scope holding step is changed to the new scope.

61. A computer-readable medium storing a program comprising program codes of:
- a scope holding step of holding a scope indicating an object to which a user is currently giving attention in accordance with at least one of a picture sensed by a camera and text information;
- a picture operating step of changing an image-sensing range of the camera;
- a first instruction step of instructing the camera to switch display pictures when the image-sensing range of the picture is changed in said picture operating step or the scope held in said scope holding step is changed, and instructing said scope holding step to hold a new scope corresponding to a new image-sensing range when the image-sensing range of the camera is changed in said picture operating step;
- a picture display step of displaying a picture within the image-sensing range of the camera which is designated by an instruction in said first instruction step;
- a text operating step of changing display text information;
- a second instruction step of giving an instruction to switch text information when the display text information is changed in said text operating step or the scope held in said scope holding step is changed, and instructing said scope holding step to hold a new scope when the display text information is changed in said text operating step; and
- a text display step of displaying the text information designated by an instruction in said second instruction step.

62. A computer-readable medium storing a program comprising program codes of:
- a scope holding step of holding a scope indicating an object to which a user is currently giving attention in accordance with at least one of a picture sensed by a camera, a position information of the sensed image, and text information;
- a picture operating step of changing the sensed picture;
- a first instruction step of instructing to switch display pictures when the sensed picture is changed in picture operating step or the scope held in said scope holding step is changed, and instructing said scope holding step to hold a new scope corresponding to a new sensed picture when the sensed picture is changed in said picture operating step;
- a picture display step of displaying a picture which is designated by an instruction in said first instruction step;
- a position operating step of changing the scope in said scope holding step by designating an object position by giving an instruction;
- a second instruction step of updating display of position information of the sensed image which is displayed when the scope is changed in said position operating step or the scope held in said scope holding step is changed, and instructing said scope holding step to hold a new scope when the scope is changed in said position operating step;
- a position display step of displaying a position designated by an instruction in said second instruction step;
- a text operating step of changing a display text information;
- a third instruction step of giving an instruction to switch text information when the display text information is changed in said text operating step or the scope held in said scope holding step is changed, and instructing said scope holding step to hold a new scope when the display text information is changed in said text operating step; and
- a text display step of displaying the text information designated by an instruction in said third instruction step.

* * * * *

UNITED STATES PATENT AND TRADEMARK OFFICE
CERTIFICATE OF CORRECTION

| | |
|---|---|
| PATENT NO. | : 7,136,093 B1 |
| APPLICATION NO. | : 09/527984 |
| DATED | : November 14, 2006 |
| INVENTOR(S) | : Itoh et al. |

Page 1 of 1

It is certified that error appears in the above-identified patent and that said Letters Patent is hereby corrected as shown below:

In the Claims:

In claim 11 (col. 21, line 33), please replace "display" with --operating--.

In claim 21 (col. 23, line 2), please replace "display" with --operating--.

In claim 43 (col. 25, line 45), please replace "Instruction" with --instruction--.

In claim 55 (col. 27, line 30), please replace "is" with --in--.

In claim 58 (col. 28, line 25), please replace "instructior" with --instruction--.

In claim 60 (col. 29, line 2), please replace "of camera" with --of a camera--.

Signed and Sealed this

Sixth Day of February, 2007

JON W. DUDAS
*Director of the United States Patent and Trademark Office*